United States Patent
Lien et al.

(10) Patent No.: US 10,310,621 B1
(45) Date of Patent: Jun. 4, 2019

(54) RADAR GESTURE SENSING USING EXISTING DATA PROTOCOLS

(71) Applicant: Google Inc., Mountain View, CA (US)

(72) Inventors: Jaime Lien, Mountain View, CA (US); Patrick M. Amihood, San Francisco, CA (US); Hakim Kader Bhai Raja, San Francisco, CA (US)

(73) Assignee: Google LLC, Mountain View, CA (US)

( * ) Notice: Subject to any disclaimer, the term of this patent is extended or adjusted under 35 U.S.C. 154(b) by 281 days.

(21) Appl. No.: 15/286,837

(22) Filed: Oct. 6, 2016

Related U.S. Application Data

(60) Provisional application No. 62/237,975, filed on Oct. 6, 2015.

(51) Int. Cl.
*G01S 7/41* (2006.01)
*G06F 3/01* (2006.01)
*G01S 13/56* (2006.01)

(52) U.S. Cl.
CPC .............. *G06F 3/017* (2013.01); *G01S 7/415* (2013.01); *G01S 13/56* (2013.01)

(58) Field of Classification Search
CPC ........ G01S 7/415; G01S 13/86; G01S 13/862; G01S 13/865; G01S 13/867; G01S 13/88; G06F 3/011; G06F 3/017
See application file for complete search history.

(56) References Cited

U.S. PATENT DOCUMENTS

| | | | |
|---|---|---|---|
| 3,610,874 A | 10/1971 | Gagliano | |
| 3,752,017 A | 8/1973 | Lloyd et al. | |
| 3,953,706 A | 4/1976 | Harris et al. | |
| 4,104,012 A | 8/1978 | Ferrante | |
| 4,654,967 A | 4/1987 | Thenner | |
| 4,700,044 A | 10/1987 | Hokanson et al. | |
| 4,795,998 A | 1/1989 | Dunbar et al. | |
| 4,838,797 A | 6/1989 | Dodier | |
| 5,016,500 A | 5/1991 | Conrad et al. | |
| 5,121,124 A | 6/1992 | Spivey et al. | |
| 5,298,715 A | 3/1994 | Chalco et al. | |

(Continued)

FOREIGN PATENT DOCUMENTS

| | | |
|---|---|---|
| CN | 1462382 | 12/2003 |
| CN | 101751126 | 6/2010 |

(Continued)

OTHER PUBLICATIONS

"Corrected Notice of Allowance", U.S. Appl. No. 15/362,359, dated Sep. 17, 2018, 10 pages.

(Continued)

*Primary Examiner* — Peter M Bythrow
(74) *Attorney, Agent, or Firm* — Colby Nipper

(57) ABSTRACT

This document describes techniques using, and devices embodying, radar gesture sensing using existing data protocols. These techniques and devices enable transmitting data according to an existing data protocol, modulating the data on a radar field to transmit to another device, and sensing user gestures by analyzing reflections of portions of transmitted data by the transmitting or receiving device. Techniques are also described to filter received signals based on addressing information in the transmitted data to limit gesture recognition at a receiving device to transmitting devices known to the receiver.

20 Claims, 9 Drawing Sheets

(56) References Cited

U.S. PATENT DOCUMENTS

| | | |
|---|---|---|
| 5,341,979 A | 8/1994 | Gupta |
| 5,410,471 A | 4/1995 | Alyfuku et al. |
| 5,468,917 A | 11/1995 | Brodsky et al. |
| 5,564,571 A | 10/1996 | Zanotti |
| 5,656,798 A | 8/1997 | Kubo et al. |
| 5,724,707 A | 3/1998 | Kirk et al. |
| 5,798,798 A | 8/1998 | Rector et al. |
| 6,032,450 A | 3/2000 | Blum |
| 6,037,893 A | 3/2000 | Lipman |
| 6,080,690 A | 6/2000 | Lebby et al. |
| 6,101,431 A | 8/2000 | Niwa et al. |
| 6,210,771 B1 | 4/2001 | Post et al. |
| 6,254,544 B1 | 7/2001 | Hayashi |
| 6,313,825 B1 | 11/2001 | Gilbert |
| 6,340,979 B1 | 1/2002 | Beaton et al. |
| 6,386,757 B1 | 5/2002 | Konno |
| 6,440,593 B2 | 8/2002 | Ellison et al. |
| 6,492,980 B2 | 12/2002 | Sandbach |
| 6,493,933 B1 | 12/2002 | Post et al. |
| 6,513,833 B2 | 2/2003 | Breed et al. |
| 6,513,970 B1 | 2/2003 | Tabata et al. |
| 6,524,239 B1 | 2/2003 | Reed et al. |
| 6,543,668 B1 | 4/2003 | Fujii et al. |
| 6,616,613 B1 | 9/2003 | Goodman |
| 6,711,354 B2 | 3/2004 | Kameyama |
| 6,717,065 B2 | 4/2004 | Hosaka et al. |
| 6,802,720 B2 | 10/2004 | Weiss et al. |
| 6,833,807 B2 | 12/2004 | Flacke et al. |
| 6,835,898 B2 | 12/2004 | Eldridge et al. |
| 6,854,985 B1 | 2/2005 | Weiss |
| 6,929,484 B2 | 8/2005 | Weiss et al. |
| 6,970,128 B1 | 11/2005 | Dwelly et al. |
| 6,997,882 B1 | 2/2006 | Parker et al. |
| 7,019,682 B1 | 3/2006 | Louberg et al. |
| 7,134,879 B2 | 11/2006 | Sugimoto et al. |
| 7,164,820 B2 | 1/2007 | Eves et al. |
| 7,194,371 B1 | 3/2007 | McBride et al. |
| 7,223,105 B2 | 5/2007 | Weiss et al. |
| 7,230,610 B2 | 6/2007 | Jung et al. |
| 7,249,954 B2 | 7/2007 | Weiss |
| 7,266,532 B2 | 9/2007 | Sutton et al. |
| 7,299,964 B2 | 11/2007 | Jayaraman et al. |
| 7,310,236 B2 | 12/2007 | Takahashi et al. |
| 7,317,416 B2 | 1/2008 | Flom et al. |
| 7,348,285 B2 | 3/2008 | Dhawan et al. |
| 7,365,031 B2 | 4/2008 | Swallow et al. |
| 7,421,061 B2 | 9/2008 | Boese et al. |
| 7,462,035 B2 | 12/2008 | Lee et al. |
| 7,528,082 B2 | 5/2009 | Krans et al. |
| 7,544,627 B2 | 6/2009 | Tao et al. |
| 7,578,195 B2 | 8/2009 | DeAngelis et al. |
| 7,644,488 B2 | 1/2010 | Aisenbrey |
| 7,647,093 B2 | 1/2010 | Bojovic et al. |
| 7,670,144 B2 | 3/2010 | Ito et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 7,791,700 B2 | 9/2010 | Bellamy |
| 7,834,276 B2 | 11/2010 | Chou et al. |
| 7,941,676 B2 | 5/2011 | Glaser |
| 7,952,512 B1 * | 5/2011 | Delker ............... G01S 13/825 342/126 |
| 7,999,722 B2 | 8/2011 | Beeri et al. |
| 8,062,220 B2 | 11/2011 | Kurtz et al. |
| 8,063,815 B2 | 11/2011 | Valo et al. |
| 8,169,404 B1 | 5/2012 | Boillot |
| 8,179,604 B1 | 5/2012 | Prada Gomez et al. |
| 8,193,929 B1 | 6/2012 | Siu et al. |
| 8,199,104 B2 | 6/2012 | Park et al. |
| 8,282,232 B2 | 10/2012 | Hsu et al. |
| 8,289,185 B2 | 10/2012 | Alonso |
| 8,301,232 B2 | 10/2012 | Albert et al. |
| 8,314,732 B2 * | 11/2012 | Oswald ............... G01S 7/2926 342/114 |
| 8,334,226 B2 | 12/2012 | Nhan et al. |
| 8,341,762 B2 | 1/2013 | Balzano |
| 8,344,949 B2 * | 1/2013 | Moshfeghi ............ G01S 5/0263 342/457 |
| 8,367,942 B2 | 2/2013 | Howell et al. |
| 8,475,367 B1 | 7/2013 | Yuen et al. |
| 8,505,474 B2 | 8/2013 | Kang et al. |
| 8,509,882 B2 | 8/2013 | Albert et al. |
| 8,514,221 B2 | 8/2013 | King et al. |
| 8,527,146 B1 | 9/2013 | Jackson et al. |
| 8,549,829 B2 | 10/2013 | Song et al. |
| 8,560,972 B2 | 10/2013 | Wilson |
| 8,562,526 B2 | 10/2013 | Heneghan et al. |
| 8,569,189 B2 | 10/2013 | Bhattacharya et al. |
| 8,614,689 B2 | 12/2013 | Nishikawa et al. |
| 8,655,004 B2 | 2/2014 | Prest et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,785,778 B2 | 7/2014 | Streeter et al. |
| 8,790,257 B2 | 7/2014 | Libbus et al. |
| 8,814,574 B2 | 8/2014 | Selby et al. |
| 8,819,812 B1 | 8/2014 | Weber et al. |
| 8,854,433 B1 | 10/2014 | Rafii |
| 8,860,602 B2 | 10/2014 | Nohara et al. |
| 8,921,473 B1 | 12/2014 | Hyman |
| 8,948,839 B1 | 2/2015 | Longinotti-Buitoni et al. |
| 9,055,879 B2 | 6/2015 | Selby et al. |
| 9,093,289 B2 | 7/2015 | Vicard et al. |
| 9,125,456 B2 | 9/2015 | Chow |
| 9,141,194 B1 | 9/2015 | Keyes et al. |
| 9,148,949 B2 | 9/2015 | Zhou et al. |
| 9,229,102 B1 | 1/2016 | Wright et al. |
| 9,230,160 B1 | 1/2016 | Kanter |
| 9,235,241 B2 * | 1/2016 | Newham ............... G06F 1/1694 |
| 9,316,727 B2 | 4/2016 | Sentelle et al. |
| 9,331,422 B2 | 5/2016 | Nazzaro et al. |
| 9,335,825 B2 | 5/2016 | Rautiainen et al. |
| 9,346,167 B2 | 5/2016 | O'Connor et al. |
| 9,354,709 B1 | 5/2016 | Heller et al. |
| 9,508,141 B2 | 11/2016 | Khachaturian et al. |
| 9,569,001 B2 | 2/2017 | Mistry et al. |
| 9,575,560 B2 | 2/2017 | Poupyrev et al. |
| 9,588,625 B2 | 3/2017 | Poupyrev |
| 9,594,443 B2 | 3/2017 | Vanblon et al. |
| 9,600,080 B2 | 3/2017 | Poupyrev |
| 9,693,592 B2 | 7/2017 | Robinson et al. |
| 9,746,551 B2 | 8/2017 | Scholten et al. |
| 9,766,742 B2 | 9/2017 | Papakostas |
| 9,778,749 B2 | 10/2017 | Poupyrev |
| 9,811,164 B2 | 11/2017 | Poupyrev |
| 9,817,109 B2 * | 11/2017 | Saboo ............... G01S 13/02 |
| 9,837,760 B2 | 12/2017 | Karagozler et al. |
| 9,848,780 B1 | 12/2017 | DeBusschere et al. |
| 9,921,660 B2 | 3/2018 | Poupyrev |
| 9,933,908 B2 | 4/2018 | Poupyrev |
| 9,947,080 B2 | 4/2018 | Nguyen et al. |
| 9,971,414 B2 | 5/2018 | Gollakota et al. |
| 9,971,415 B2 | 5/2018 | Poupyrev et al. |
| 9,983,747 B2 | 5/2018 | Poupyrev |
| 9,994,233 B2 | 6/2018 | Diaz-Jimenez et al. |
| 10,016,162 B1 | 7/2018 | Rogers et al. |
| 10,034,630 B2 | 7/2018 | Lee et al. |
| 10,073,590 B2 | 9/2018 | Dascola et al. |
| 10,080,528 B2 | 9/2018 | DeBusschere et al. |
| 10,082,950 B2 | 9/2018 | Lapp |
| 10,088,908 B1 | 10/2018 | Poupyrev et al. |
| 10,139,916 B2 | 11/2018 | Poupyrev |
| 10,155,274 B2 | 12/2018 | Robinson et al. |
| 10,175,781 B2 | 1/2019 | Karagozler et al. |
| 10,203,763 B1 | 2/2019 | Poupyrev et al. |
| 10,222,469 B1 | 3/2019 | Gillian et al. |
| 10,241,581 B2 | 3/2019 | Lien et al. |
| 2001/0035836 A1 | 11/2001 | Miceli et al. |
| 2002/0009972 A1 | 1/2002 | Amento et al. |
| 2002/0080156 A1 | 6/2002 | Abbott et al. |
| 2002/0170897 A1 | 11/2002 | Hall |
| 2003/0005030 A1 | 1/2003 | Sutton et al. |
| 2003/0071750 A1 | 4/2003 | Benitz |

(56) References Cited

U.S. PATENT DOCUMENTS

| | | |
|---|---|---|
| 2003/0093000 A1 | 5/2003 | Nishio et al. |
| 2003/0100228 A1 | 5/2003 | Bungo et al. |
| 2003/0119391 A1 | 6/2003 | Swallow et al. |
| 2003/0122677 A1 | 7/2003 | Kail |
| 2004/0009729 A1 | 1/2004 | Hill et al. |
| 2004/0102693 A1 | 5/2004 | Jenkins |
| 2004/0249250 A1 | 12/2004 | McGee et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2005/0231419 A1 | 10/2005 | Mitchell |
| 2006/0035554 A1 | 2/2006 | Glaser et al. |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0125803 A1 | 6/2006 | Westerman et al. |
| 2006/0136997 A1 | 6/2006 | Telek et al. |
| 2006/0139162 A1 | 6/2006 | Flynn |
| 2006/0139314 A1 | 6/2006 | Bell |
| 2006/0148351 A1 | 7/2006 | Tao et al. |
| 2006/0157734 A1 | 7/2006 | Onodero et al. |
| 2006/0166620 A1 | 7/2006 | Sorensen |
| 2006/0170584 A1 | 8/2006 | Romero et al. |
| 2006/0209021 A1 | 9/2006 | Yoo et al. |
| 2006/0258205 A1 | 11/2006 | Locher et al. |
| 2007/0024488 A1 | 2/2007 | Zemany et al. |
| 2007/0026695 A1 | 2/2007 | Lee et al. |
| 2007/0027369 A1 | 2/2007 | Pagnacco et al. |
| 2007/0118043 A1 | 5/2007 | Oliver et al. |
| 2007/0161921 A1 | 7/2007 | Rausch |
| 2007/0164896 A1 | 7/2007 | Suzuki et al. |
| 2007/0176821 A1 | 8/2007 | Flom et al. |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1 | 9/2007 | Maurer et al. |
| 2007/0237423 A1 | 10/2007 | Tico et al. |
| 2008/0001735 A1 | 1/2008 | Tran |
| 2008/0002027 A1* | 1/2008 | Kondo .................. G05B 15/02 348/148 |
| 2008/0015422 A1 | 1/2008 | Wessel |
| 2008/0024438 A1 | 1/2008 | Collins et al. |
| 2008/0039731 A1 | 2/2008 | McCombie et al. |
| 2008/0059578 A1 | 3/2008 | Albertson et al. |
| 2008/0065291 A1 | 3/2008 | Breed |
| 2008/0134102 A1 | 6/2008 | Movold et al. |
| 2008/0136775 A1 | 6/2008 | Conant |
| 2008/0168396 A1 | 7/2008 | Matas et al. |
| 2008/0194204 A1 | 8/2008 | Duet et al. |
| 2008/0194975 A1 | 8/2008 | MacQuarrie et al. |
| 2008/0211766 A1 | 9/2008 | Westerman et al. |
| 2008/0233822 A1 | 9/2008 | Swallow et al. |
| 2008/0278450 A1 | 11/2008 | Lashina |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1* | 12/2008 | Rofougaran .......... A63F 13/235 342/22 |
| 2008/0320419 A1 | 12/2008 | Matas et al. |
| 2009/0018408 A1 | 1/2009 | Ouchi et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder et al. |
| 2009/0226043 A1 | 9/2009 | Angell et al. |
| 2009/0253585 A1 | 10/2009 | Diatchenko et al. |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0295712 A1 | 12/2009 | Ritzau |
| 2009/0319181 A1 | 12/2009 | Khosravy et al. |
| 2010/0045513 A1 | 2/2010 | Pett et al. |
| 2010/0050133 A1 | 2/2010 | Nishihara et al. |
| 2010/0053151 A1 | 3/2010 | Marti et al. |
| 2010/0060570 A1 | 3/2010 | Underkoffler et al. |
| 2010/0065320 A1 | 3/2010 | Urano |
| 2010/0069730 A1 | 3/2010 | Bergstrom et al. |
| 2010/0071205 A1 | 3/2010 | Graumann et al. |
| 2010/0094141 A1 | 4/2010 | Puswella |
| 2010/0109938 A1 | 5/2010 | Oswald et al. |
| 2010/0152600 A1 | 6/2010 | Droitcour et al. |
| 2010/0179820 A1 | 7/2010 | Harrison et al. |
| 2010/0201586 A1 | 8/2010 | Michalk |
| 2010/0204550 A1 | 8/2010 | Heneghan et al. |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0002912 A1 | 10/2010 | Solinsky |
| 2010/0281438 A1 | 11/2010 | Latta et al. |
| 2010/0292549 A1 | 11/2010 | Schuler |
| 2010/0306713 A1 | 12/2010 | Geisner et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0018795 A1 | 1/2011 | Jang |
| 2011/0029038 A1 | 2/2011 | Hyde et al. |
| 2011/0073353 A1 | 3/2011 | Lee et al. |
| 2011/0083111 A1 | 4/2011 | Forutanpour et al. |
| 2011/0093820 A1 | 4/2011 | Zhang et al. |
| 2011/0118564 A1 | 5/2011 | Sankai |
| 2011/0119640 A1 | 5/2011 | Berkes et al. |
| 2011/0166940 A1* | 7/2011 | Bangera .................. G01S 7/412 705/14.66 |
| 2011/0181509 A1 | 7/2011 | Rautiainen et al. |
| 2011/0181510 A1* | 7/2011 | Hakala .................... G06F 3/017 345/158 |
| 2011/0193939 A1 | 8/2011 | Vassigh et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1* | 9/2011 | Ajmera .................... G06F 3/017 345/158 |
| 2011/0239118 A1 | 9/2011 | Yamaoka et al. |
| 2011/0245688 A1 | 10/2011 | Arora et al. |
| 2011/0279303 A1* | 11/2011 | Smith, Jr. ............... G01S 13/89 342/52 |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0316888 A1 | 12/2011 | Sachs et al. |
| 2011/0318985 A1 | 12/2011 | McDermid |
| 2012/0001875 A1 | 1/2012 | Li et al. |
| 2012/0019168 A1 | 1/2012 | Noda et al. |
| 2012/0029369 A1 | 2/2012 | Icove et al. |
| 2012/0047468 A1 | 2/2012 | Santos et al. |
| 2012/0068876 A1* | 3/2012 | Bangera .................. G01S 7/415 342/27 |
| 2012/0092284 A1 | 4/2012 | Rofougaran et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0150493 A1 | 6/2012 | Casey et al. |
| 2012/0154313 A1 | 6/2012 | Au et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0193801 A1 | 8/2012 | Gross et al. |
| 2012/0220835 A1 | 8/2012 | Chung |
| 2012/0248093 A1 | 10/2012 | Ulrich et al. |
| 2012/0254810 A1 | 10/2012 | Heck et al. |
| 2012/0268416 A1 | 10/2012 | Pirogov et al. |

(56) References Cited

U.S. PATENT DOCUMENTS

| | | | |
|---|---|---|---|
| 2012/0280900 A1* | 11/2012 | Wang | G06F 3/0488 345/156 |
| 2012/0298748 A1 | 11/2012 | Factor et al. | |
| 2012/0310665 A1 | 12/2012 | Xu et al. | |
| 2013/0016070 A1 | 1/2013 | Starner et al. | |
| 2013/0027218 A1 | 1/2013 | Schwarz et al. | |
| 2013/0035563 A1 | 2/2013 | Angellides | |
| 2013/0046544 A1 | 2/2013 | Kay et al. | |
| 2013/0053653 A1 | 2/2013 | Cuddihy et al. | |
| 2013/0078624 A1 | 3/2013 | Holmes et al. | |
| 2013/0082922 A1 | 4/2013 | Miller | |
| 2013/0083173 A1 | 4/2013 | Geisner et al. | |
| 2013/0086533 A1 | 4/2013 | Stienstra | |
| 2013/0096439 A1 | 4/2013 | Lee et al. | |
| 2013/0102217 A1 | 4/2013 | Jeon | |
| 2013/0104084 A1 | 4/2013 | Mlyniec et al. | |
| 2013/0113647 A1 | 5/2013 | Sentelle et al. | |
| 2013/0113830 A1 | 5/2013 | Suzuki | |
| 2013/0117377 A1 | 5/2013 | Miller | |
| 2013/0132931 A1 | 5/2013 | Bruns et al. | |
| 2013/0147833 A1 | 6/2013 | Aubauer et al. | |
| 2013/0150735 A1 | 6/2013 | Cheng | |
| 2013/0161078 A1 | 6/2013 | Li | |
| 2013/0169471 A1* | 7/2013 | Lynch | G01S 7/352 342/107 |
| 2013/0176161 A1 | 7/2013 | Derham et al. | |
| 2013/0194173 A1 | 8/2013 | Zhu et al. | |
| 2013/0195330 A1 | 8/2013 | Kim et al. | |
| 2013/0196716 A1 | 8/2013 | Muhammad | |
| 2013/0207962 A1 | 8/2013 | Oberdorfer et al. | |
| 2013/0229508 A1 | 9/2013 | Li et al. | |
| 2013/0241765 A1 | 9/2013 | Kozma et al. | |
| 2013/0245986 A1 | 9/2013 | Grokop et al. | |
| 2013/0253029 A1 | 9/2013 | Jain et al. | |
| 2013/0260630 A1 | 10/2013 | Ito et al. | |
| 2013/0278499 A1 | 10/2013 | Anderson | |
| 2013/0278501 A1 | 10/2013 | Bulzacki | |
| 2013/0283203 A1 | 10/2013 | Batraski et al. | |
| 2013/0322729 A1 | 12/2013 | Mestha et al. | |
| 2013/0332438 A1 | 12/2013 | Li et al. | |
| 2013/0345569 A1 | 12/2013 | Mestha et al. | |
| 2014/0005809 A1 | 1/2014 | Frei et al. | |
| 2014/0022108 A1 | 1/2014 | Alberth et al. | |
| 2014/0028539 A1* | 1/2014 | Newham | G06F 1/1694 345/156 |
| 2014/0049487 A1 | 2/2014 | Konertz et al. | |
| 2014/0050354 A1 | 2/2014 | Heim et al. | |
| 2014/0051941 A1 | 2/2014 | Messerschmidt | |
| 2014/0070957 A1 | 3/2014 | Longinotti-Buitoni et al. | |
| 2014/0072190 A1 | 3/2014 | Wu et al. | |
| 2014/0073486 A1 | 3/2014 | Ahmed et al. | |
| 2014/0073969 A1 | 3/2014 | Zou et al. | |
| 2014/0081100 A1 | 3/2014 | Muhsin et al. | |
| 2014/0095480 A1 | 4/2014 | Marantz et al. | |
| 2014/0097979 A1 | 4/2014 | Nohara et al. | |
| 2014/0121540 A1 | 5/2014 | Raskin | |
| 2014/0135631 A1 | 5/2014 | Brumback et al. | |
| 2014/0139422 A1 | 5/2014 | Mistry et al. | |
| 2014/0139616 A1 | 5/2014 | Pinter et al. | |
| 2014/0143678 A1 | 5/2014 | Mistry et al. | |
| 2014/0149859 A1 | 5/2014 | Van Dyken et al. | |
| 2014/0184496 A1 | 7/2014 | Gribetz et al. | |
| 2014/0184499 A1 | 7/2014 | Kim | |
| 2014/0191939 A1 | 7/2014 | Penn et al. | |
| 2014/0200416 A1 | 7/2014 | Kashef et al. | |
| 2014/0201690 A1 | 7/2014 | Holz | |
| 2014/0208275 A1 | 7/2014 | Mongia et al. | |
| 2014/0215389 A1 | 7/2014 | Walsh et al. | |
| 2014/0239065 A1 | 8/2014 | Zhou et al. | |
| 2014/0244277 A1 | 8/2014 | Krishna Rao et al. | |
| 2014/0246415 A1 | 9/2014 | Wittkowski | |
| 2014/0247212 A1* | 9/2014 | Kim | G06F 3/011 345/156 |
| 2014/0250515 A1 | 9/2014 | Jakobsson | |
| 2014/0253431 A1 | 9/2014 | Gossweiler et al. | |
| 2014/0253709 A1 | 9/2014 | Bresch et al. | |
| 2014/0262478 A1 | 9/2014 | Harris et al. | |
| 2014/0275854 A1 | 9/2014 | Venkatraman et al. | |
| 2014/0280295 A1 | 9/2014 | Kurochikin et al. | |
| 2014/0281975 A1 | 9/2014 | Anderson | |
| 2014/0282877 A1 | 9/2014 | Mahaffey et al. | |
| 2014/0297006 A1 | 10/2014 | Sadhu | |
| 2014/0298266 A1 | 10/2014 | Lapp | |
| 2014/0300506 A1 | 10/2014 | Alton et al. | |
| 2014/0306936 A1 | 10/2014 | Dahl et al. | |
| 2014/0309855 A1 | 10/2014 | Tran | |
| 2014/0316261 A1 | 10/2014 | Lux et al. | |
| 2014/0318699 A1 | 10/2014 | Longinotti-Buitoni et al. | |
| 2014/0324888 A1* | 10/2014 | Xie | G06F 3/017 707/748 |
| 2014/0329567 A1 | 11/2014 | Chan et al. | |
| 2014/0333467 A1* | 11/2014 | Inomata | G01S 13/867 342/27 |
| 2014/0343392 A1 | 11/2014 | Yang | |
| 2014/0347295 A1 | 11/2014 | Kim et al. | |
| 2014/0357369 A1 | 12/2014 | Callens et al. | |
| 2014/0368378 A1 | 12/2014 | Crain et al. | |
| 2014/0368441 A1 | 12/2014 | Touloumtzis | |
| 2014/0376788 A1 | 12/2014 | Xu et al. | |
| 2015/0002391 A1 | 1/2015 | Chen | |
| 2015/0009096 A1 | 1/2015 | Lee et al. | |
| 2015/0026815 A1 | 1/2015 | Barrett | |
| 2015/0029050 A1 | 1/2015 | Driscoll et al. | |
| 2015/0030256 A1 | 1/2015 | Brady et al. | |
| 2015/0040040 A1 | 2/2015 | Balan et al. | |
| 2015/0046183 A1 | 2/2015 | Cireddu | |
| 2015/0062033 A1 | 3/2015 | Ishihara | |
| 2015/0068069 A1 | 3/2015 | Tran et al. | |
| 2015/0077282 A1 | 3/2015 | Mohamadi | |
| 2015/0085060 A1 | 3/2015 | Fish et al. | |
| 2015/0091820 A1 | 4/2015 | Rosenberg et al. | |
| 2015/0091858 A1 | 4/2015 | Rosenberg et al. | |
| 2015/0091859 A1 | 4/2015 | Rosenberg et al. | |
| 2015/0091903 A1 | 4/2015 | Costello et al. | |
| 2015/0095987 A1 | 4/2015 | Potash et al. | |
| 2015/0099941 A1 | 4/2015 | Tran | |
| 2015/0100328 A1 | 4/2015 | Kress et al. | |
| 2015/0109164 A1 | 4/2015 | Takaki | |
| 2015/0112606 A1 | 4/2015 | He et al. | |
| 2015/0133017 A1 | 5/2015 | Liao et al. | |
| 2015/0143601 A1 | 5/2015 | Longinotti-Buitoni et al. | |
| 2015/0145805 A1 | 5/2015 | Liu | |
| 2015/0162729 A1 | 6/2015 | Reversat et al. | |
| 2015/0177866 A1 | 6/2015 | Hwang et al. | |
| 2015/0185314 A1 | 7/2015 | Corcos et al. | |
| 2015/0199045 A1 | 7/2015 | Robucci et al. | |
| 2015/0205358 A1 | 7/2015 | Lyren | |
| 2015/0223733 A1 | 8/2015 | Al-Alusi | |
| 2015/0226004 A1 | 8/2015 | Thompson | |
| 2015/0229885 A1 | 8/2015 | Offenhaeuser | |
| 2015/0256763 A1 | 9/2015 | Niemi | |
| 2015/0261320 A1 | 9/2015 | Leto | |
| 2015/0268027 A1 | 9/2015 | Gerdes | |
| 2015/0268799 A1 | 9/2015 | Starner et al. | |
| 2015/0277569 A1* | 10/2015 | Sprenger | G06F 3/017 345/156 |
| 2015/0280102 A1 | 10/2015 | Tajitsu et al. | |
| 2015/0285906 A1 | 10/2015 | Hooper et al. | |
| 2015/0287187 A1 | 10/2015 | Redtel | |
| 2015/0301167 A1 | 10/2015 | Sentelle et al. | |
| 2015/0312041 A1 | 10/2015 | Choi | |
| 2015/0314780 A1 | 11/2015 | Stenneth et al. | |
| 2015/0317518 A1 | 11/2015 | Fujimaki et al. | |
| 2015/0323993 A1 | 11/2015 | Levesque et al. | |
| 2015/0332075 A1 | 11/2015 | Burch | |
| 2015/0341550 A1 | 11/2015 | Lay | |
| 2015/0346820 A1 | 12/2015 | Poupyrev et al. | |
| 2015/0350902 A1 | 12/2015 | Baxley et al. | |
| 2015/0351703 A1 | 12/2015 | Phillips et al. | |
| 2015/0375339 A1 | 12/2015 | Sterling et al. | |
| 2016/0018948 A1 | 1/2016 | Parvarandeh et al. | |
| 2016/0026253 A1 | 1/2016 | Bradski et al. | |
| 2016/0038083 A1 | 2/2016 | Ding et al. | |
| 2016/0041617 A1 | 2/2016 | Poupyrev | |

(56) References Cited

U.S. PATENT DOCUMENTS

| | | | |
|---|---|---|---|
| 2016/0041618 A1* | 2/2016 | Poupyrev | G01S 13/88 342/61 |
| 2016/0042169 A1 | 2/2016 | Polehn | |
| 2016/0048235 A1 | 2/2016 | Poupyrev | |
| 2016/0048236 A1 | 2/2016 | Poupyrev | |
| 2016/0048672 A1 | 2/2016 | Lux et al. | |
| 2016/0054792 A1 | 2/2016 | Poupyrev | |
| 2016/0054803 A1* | 2/2016 | Poupyrev | G06F 3/017 345/156 |
| 2016/0054804 A1* | 2/2016 | Gollakata | G06F 3/017 345/156 |
| 2016/0055201 A1 | 2/2016 | Poupyrev et al. | |
| 2016/0090839 A1 | 3/2016 | Stolarcyzk | |
| 2016/0098089 A1 | 4/2016 | Poupyrev | |
| 2016/0100166 A1 | 4/2016 | Dragne et al. | |
| 2016/0103500 A1 | 4/2016 | Hussey et al. | |
| 2016/0106328 A1 | 4/2016 | Mestha et al. | |
| 2016/0131741 A1 | 5/2016 | Park | |
| 2016/0140872 A1 | 5/2016 | Palmer et al. | |
| 2016/0145776 A1 | 5/2016 | Roh | |
| 2016/0170491 A1 | 6/2016 | Jung | |
| 2016/0171293 A1 | 6/2016 | Li et al. | |
| 2016/0186366 A1 | 6/2016 | McMaster | |
| 2016/0206244 A1 | 7/2016 | Rogers | |
| 2016/0213331 A1 | 7/2016 | Gil et al. | |
| 2016/0216825 A1 | 7/2016 | Forutanpour | |
| 2016/0220152 A1 | 8/2016 | Meriheina et al. | |
| 2016/0249698 A1 | 9/2016 | Berzowska et al. | |
| 2016/0252607 A1 | 9/2016 | Saboo et al. | |
| 2016/0252965 A1 | 9/2016 | Mandella et al. | |
| 2016/0253044 A1 | 9/2016 | Katz | |
| 2016/0259037 A1 | 9/2016 | Molchanov et al. | |
| 2016/0262685 A1 | 9/2016 | Wagner et al. | |
| 2016/0282988 A1 | 9/2016 | Poupyrev | |
| 2016/0283101 A1 | 9/2016 | Schwesig et al. | |
| 2016/0284436 A1 | 9/2016 | Fukuhara et al. | |
| 2016/0287172 A1 | 10/2016 | Morris et al. | |
| 2016/0299526 A1 | 10/2016 | Inagaki et al. | |
| 2016/0320852 A1 | 11/2016 | Poupyrev | |
| 2016/0320853 A1 | 11/2016 | Lien et al. | |
| 2016/0320854 A1 | 11/2016 | Lien et al. | |
| 2016/0321428 A1 | 11/2016 | Rogers | |
| 2016/0338599 A1 | 11/2016 | DeBusschere et al. | |
| 2016/0345638 A1 | 12/2016 | Robinson et al. | |
| 2016/0349790 A1 | 12/2016 | Connor | |
| 2016/0349845 A1 | 12/2016 | Poupyrev et al. | |
| 2016/0377712 A1 | 12/2016 | Wu et al. | |
| 2017/0029985 A1 | 2/2017 | Tajitsu et al. | |
| 2017/0052618 A1 | 2/2017 | Lee et al. | |
| 2017/0060254 A1 | 3/2017 | Molchanov et al. | |
| 2017/0060298 A1 | 3/2017 | Hwang et al. | |
| 2017/0075481 A1 | 3/2017 | Chou et al. | |
| 2017/0075496 A1 | 3/2017 | Rosenberg et al. | |
| 2017/0097413 A1 | 4/2017 | Gillian et al. | |
| 2017/0097684 A1 | 4/2017 | Lien | |
| 2017/0115777 A1 | 4/2017 | Poupyrev | |
| 2017/0124407 A1 | 5/2017 | Micks et al. | |
| 2017/0125940 A1 | 5/2017 | Karagozler et al. | |
| 2017/0192523 A1 | 7/2017 | Poupyrev | |
| 2017/0192629 A1 | 7/2017 | Takada et al. | |
| 2017/0196513 A1 | 7/2017 | Longinotti-Buitoni et al. | |
| 2017/0232538 A1 | 8/2017 | Robinson et al. | |
| 2017/0233903 A1 | 8/2017 | Jeon | |
| 2017/0249033 A1 | 8/2017 | Podhajny et al. | |
| 2017/0322633 A1 | 11/2017 | Shen et al. | |
| 2017/0325337 A1 | 11/2017 | Karagozler et al. | |
| 2017/0325518 A1 | 11/2017 | Poupyrev et al. | |
| 2017/0329412 A1 | 11/2017 | Schwesig et al. | |
| 2017/0329425 A1 | 11/2017 | Karagozler et al. | |
| 2018/0000354 A1 | 1/2018 | DeBusschere et al. | |
| 2018/0000355 A1 | 1/2018 | DeBusschere et al. | |
| 2018/0004301 A1 | 1/2018 | Poupyrev | |
| 2018/0005766 A1 | 1/2018 | Fairbanks et al. | |
| 2018/0046258 A1 | 2/2018 | Poupyrev | |
| 2018/0095541 A1 | 4/2018 | Gribetz et al. | |
| 2018/0106897 A1 | 4/2018 | Shouldice et al. | |
| 2018/0113032 A1 | 4/2018 | Dickey et al. | |
| 2018/0157330 A1 | 6/2018 | Gu et al. | |
| 2018/0160943 A1 | 6/2018 | Fyfe et al. | |
| 2018/0177464 A1 | 6/2018 | DeBusschere et al. | |
| 2018/0196527 A1 | 7/2018 | Poupyrev et al. | |
| 2018/0256106 A1 | 9/2018 | Rogers et al. | |
| 2018/0296163 A1 | 10/2018 | DeBusschere et al. | |
| 2018/0321841 A1 | 11/2018 | Lapp | |
| 2019/0033981 A1 | 1/2019 | Poupyrev | |

FOREIGN PATENT DOCUMENTS

| | | |
|---|---|---|
| CN | 102414641 | 4/2012 |
| CN | 102782612 | 11/2012 |
| CN | 102893327 | 1/2013 |
| CN | 202887794 | 4/2013 |
| CN | 103076911 | 5/2013 |
| CN | 103502911 | 1/2014 |
| CN | 102660988 | 3/2014 |
| CN | 104035552 | 9/2014 |
| CN | 103355860 | 1/2016 |
| DE | 102011075725 | 11/2012 |
| DE | 102013201359 | 7/2014 |
| EP | 0161895 | 11/1985 |
| EP | 1785744 | 5/2007 |
| EP | 1815788 | 8/2007 |
| EP | 2417908 | 2/2012 |
| EP | 2637081 | 9/2013 |
| EP | 2770408 | 8/2014 |
| EP | 2953007 | 12/2015 |
| EP | 3201726 | 8/2017 |
| FR | 3017722 | 8/2015 |
| GB | 2070469 | 9/1981 |
| GB | 2443208 | 4/2008 |
| JP | 113860 | 4/1999 |
| JP | 11168268 | 6/1999 |
| JP | 2003280049 | 10/2003 |
| JP | 2006234716 | 9/2006 |
| JP | 2007011873 | 1/2007 |
| JP | 2007132768 | 5/2007 |
| JP | 2008287714 | 11/2008 |
| JP | 2009037434 | 2/2009 |
| JP | 2011102457 | 5/2011 |
| JP | 201218583 | 9/2012 |
| JP | 2012198916 | 10/2012 |
| JP | 2013196047 | 9/2013 |
| JP | 2014532332 | 12/2014 |
| KR | 1020080102516 | 11/2008 |
| KR | 100987650 | 10/2010 |
| KR | 1020140055985 | 5/2014 |
| KR | 101914850 | 10/2018 |
| TW | 201425974 | 7/2014 |
| WO | 9001895 | 3/1990 |
| WO | WO-0130123 | 4/2001 |
| WO | WO-2001027855 | 4/2001 |
| WO | WO-0175778 | 10/2001 |
| WO | WO-2002082999 | 10/2002 |
| WO | 2004004557 | 1/2004 |
| WO | WO-2005033387 | 4/2005 |
| WO | 2007125298 | 11/2007 |
| WO | WO-2008061385 | 5/2008 |
| WO | WO-2009032073 | 3/2009 |
| WO | 2009083467 | 7/2009 |
| WO | WO-2010032173 | 3/2010 |
| WO | 2010101697 | 9/2010 |
| WO | WO-2012026013 | 3/2012 |
| WO | 2012064847 | 5/2012 |
| WO | WO-2012152476 | 11/2012 |
| WO | WO-2013082806 | 6/2013 |
| WO | WO-2013084108 | 6/2013 |
| WO | 2013192166 | 12/2013 |
| WO | WO-2013186696 | 12/2013 |
| WO | WO-2013191657 | 12/2013 |
| WO | WO-2014019085 | 2/2014 |
| WO | 2014085369 | 6/2014 |
| WO | WO-2014116968 | 7/2014 |
| WO | 2014124520 | 8/2014 |
| WO | WO-2014136027 | 9/2014 |

(56) References Cited

FOREIGN PATENT DOCUMENTS

| WO | WO-2014138280 | 9/2014 |
|---|---|---|
| WO | WO-2014160893 | 10/2014 |
| WO | WO-2014165476 | 10/2014 |
| WO | WO-2014204323 | 12/2014 |
| WO | WO-2015017931 | 2/2015 |
| WO | WO-2015022671 | 2/2015 |
| WO | 2016053624 | 4/2016 |
| WO | 2016118534 | 7/2016 |
| WO | 2016176471 | 11/2016 |
| WO | 2016178797 | 11/2016 |
| WO | 2017019299 | 2/2017 |
| WO | 2017062566 | 4/2017 |
| WO | 2017200571 | 11/2017 |
| WO | 20170200949 | 11/2017 |
| WO | 2018106306 | 6/2018 |

OTHER PUBLICATIONS

"Final Office Action", U.S. Appl. No. 14/504,121, dated Jul. 9, 2018, 23 pages.
"Final Office Action", U.S. Appl. No. 15/166,198, dated Sep. 27, 2018, 33 pages.
"Foreign Office Action", Japanese Application No. 2018-501256, dated Jul. 24, 2018, 11 pages.
"Non-Final Office Action", U.S. Appl. No. 15/287,253, dated Sep. 7, 2018, 20 pages.
"Non-Final Office Action", U.S. Appl. No. 14/504,139, dated Oct. 5, 2018, 16 pages.
"Non-Final Office Action", U.S. Appl. No. 15/286,512, dated Jul. 19, 2018, 15 pages.
"Non-Final Office Action", U.S. Appl. No. 15/142,829, dated Aug. 16, 2018, 15 pages.
"Notice of Allowance", U.S. Appl. No. 15/362,359, dated Aug. 3, 2018, 8 pages.
"Notice of Allowance", U.S. Appl. No. 14/874,955, dated Oct. 4, 2018, 8 pages.
"Notice of Allowance", U.S. Appl. No. 15/142,619, dated Aug. 13, 2018, 9 pages.
"Notice of Allowance", U.S. Appl. No. 15/595,649, dated Sep. 14, 2018, 8 pages.
"Notice of Allowance", U.S. Appl. No. 15/586,174, dated Sep. 24, 2018, 5 pages.
"Pre-Interview Communication", U.S. Appl. No. 15/286,495, dated Sep. 10, 2018, 4 pages.
"Pre-Interview Communication", U.S. Appl. No. 15/287,359, dated Jul. 24, 2018, 2 pages.
"Restriction Requirement", U.S. Appl. No. 15/286,537, dated Aug. 27, 2018, 8 pages.
"Corrected Notice of Allowance", U.S. Appl. No. 14/312,486, dated Jan. 23, 2017, 4 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Dec. 19, 2016, 2 pages.
"Non-Final Office Action", U.S. Appl. No. 14/504,121, dated Jan. 9, 2017, 13 pages.
"Non-Final Office Action", U.S. Appl. No. 14/504,139, dated Jan. 27, 2017, 10 pages.
"Non-Final Office Action", U.S. Appl. No. 14/959,799, dated Jan. 27, 2017, 10 pages.
"Notice of Allowance", U.S. Appl. No. 14/930,220, dated Feb. 2, 2017, 8 pages.
"Pre-Interview Communication", U.S. Appl. No. 14/494,863, dated Jan. 27, 2017, 5 pages.
"Pre-Interview Communication", U.S. Appl. No. 14/959,901, dated Feb. 10, 2017, 3 pages.
"Corrected Notice of Allowance", U.S. Appl. No. 14/582,896, dated Feb. 23, 2017, 2 pages.
"International Preliminary Report on Patentability", Application No. PCT/US2015/043963, dated Feb. 16, 2017, 12 pages.
"International Preliminary Report on Patentability", Application No. PCT/US2015/030388, dated Dec. 15, 2016, 12 pages.
"International Preliminary Report on Patentability", Application No. PCT/US2015/043949, dated Feb. 16, 2017, 13 pages.
"International Preliminary Report on Patentability", Application No. PCT/US2015/044774, dated Mar. 2, 2017, 8 pages.
"International Search Report and Written Opinion", Application No. PCT/US2016/062082, dated Feb. 23, 2017, 12 pages.
"International Search Report and Written Opinion", Application No. PCT/US2016/055671, dated Dec. 1, 2016, 14 pages.
"Non-Final Office Action", U.S. Appl. No. 14/513,875, dated Feb. 21, 2017, 9 pages.
"Non-Final Office Action", U.S. Appl. No. 14/874,955, dated Feb. 27, 2017, 8 pages.
"Non-Final Office Action", U.S. Appl. No. 15/398,147, dated Mar. 9, 2017, 10 pages.
"Pre-Interview Communication", U.S. Appl. No. 14/959,730, dated Feb. 15, 2017, 3 pages.
"Final Office Action", U.S. Appl. No. 15/142,619, dated Feb. 8, 2018, 15 pages.
"Final Office Action", U.S. Appl. No. 15/093,533, dated Mar. 21, 2018, 19 pages.
"First Action Interview Office Action", U.S. Appl. No. 15/286,152, dated Mar. 1, 2018, 5 pages.
"Foreign Office Action", Chinese Application No. 201721290290.3, dated Mar. 9, 2018, 2 pages.
"Non-Final Office Action", U.S. Appl. No. 15/267,181, dated Feb. 8, 2018, 29 pages.
"Non-Final Office Action", U.S. Appl. No. 14/874,955, dated Feb. 8, 2018, 7 pages.
"Notice of Allowance", U.S. Appl. No. 14/959,730, dated Feb. 22, 2018, 8 pages.
"Pre-Interview Communication", U.S. Appl. No. 15/166,198, dated Mar. 8, 2018, 8 pages.
"Pre-Interview First Office Action", U.S. Appl. No. 15/286,152, dated Feb. 8, 2018, 4 pages.
"Cardiio", Retrieved from: <http://www.cardiio.com/> Apr. 15, 2015 App Information Retrieved From: <https://itunes.apple.com/us/app/cardiio-touchless-camera-pulse/id542891434?Is=1&mt=8> Apr. 15, 2015, Feb. 24, 2015, 6 pages.
"Extended European Search Report", EP Application No. 15170577.9, dated Nov. 5, 2015, 12 pages.
"Final Office Action", U.S. Appl. No. 14/312,486, dated Jun. 3, 2016, 32 pages.
"Final Office Action", U.S. Appl. No. 14/504,038, dated Sep. 27, 2016, 23 pages.
"Final Office Action", U.S. Appl. No. 14/504,061, dated Mar. 9, 2016, 10 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"International Search Report and Written Opinion", Application No. PCT/US2015/044774, dated Nov. 3, 2015, 12 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.
"International Search Report and Written Opinion", Application No. PCT/US2016/032307, dated Aug. 25, 2016, 13 pages.
"International Search Report and Written Opinion", Application No. PCT/US2016/029820, dated Jul. 15, 2016, 14 pages.
"International Search Report and Written Opinion", Application No. PCT/US2016/030177, dated Aug. 2, 2016, 15 pages.
"International Search Report and Written Opinion", Application No. PCT/US2015/043963, dated Nov. 24, 2015, 16 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.

(56) References Cited

OTHER PUBLICATIONS

"International Search Report and Written Opinion", Application No. PCT/US2015/043949, dated Dec. 1, 2015, 18 pages.
"Non-Final Office Action", U.S. Appl. No. 14/312,486, dated Oct. 23, 2015, 25 pages.
"Non-Final Office Action", U.S. Appl. No. 14/504,038, dated Feb. 26, 2016, 22 pages.
"Non-Final Office Action", U.S. Appl. No. 14/504,061, dated Nov. 4, 2015, 8 pages.
"Non-Final Office Action", U.S. Appl. No. 14/582,896, dated Jun. 29, 2016, 9 pages.
"Non-Final Office Action", U.S. Appl. No. 14/666,155, dated Aug. 24, 2016, 9 pages.
"Non-Final Office Action", U.S. Appl. No. 14/681,625, dated Aug. 12, 2016, 9 pages.
"Non-Final Office Action", U.S. Appl. No. 14/930,220, dated Sep. 14, 2016, 15 pages.
"Notice of Allowance", U.S. Appl. No. 14/312,486, dated Oct. 7, 2016, 15 pages.
"Notice of Allowance", U.S. Appl. No. 14/504,061, dated Sep. 12, 2016, 7 pages.
"Philips Vital Signs Camera", Retrieved From: <http://www.vitalsignscamera.com/> Apr. 15, 2015, Jul. 17, 2013, 2 pages.
"Restriction Requirement", U.S. Appl. No. 14/666,155, dated Jul. 22, 2016, 5 pages.
"The Instant Blood Pressure app estimates blood pressure with your smartphone and our algorithm", Retrieved at: http://www.instantbloodpressure.com/—on Jun. 23, 2016, 6 pages.
Arbabian,"A 94GHz mm-Wave to Baseband Pulsed-Radar for Imaging and Gesture Recognition", 2012 IEEE, 2012 Symposium on VLSI Circuits Digest of Technical Papers, 2012, 2 pages.
Balakrishnan,"Detecting Pulse from Head Motions in Video", In Proceedings: CVPR '13 Proceedings of the 2013 IEEE Conference on Computer Vision and Pattern Recognition Available at: <http://people.csail.mitedu/mrub/vidmag/papers/Balakrishnan_Detecting_Pulse_from_2013_CVPR_paper.pdf>, Jun. 23, 2013, 8 pages.
Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.
Espina,"Wireless Body Sensor Network for Continuous Cuff-less Blood Pressure Monitoring", International Summer School on Medical Devices and Biosensors, 2006, Sep. 2006, 5 pages.
Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
He,"A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mitedu/handle/1721.1/79221>, Feb. 2013, 137 pages.
Holleis,"Evaluating Capacitive Touch Input on Clothes", Proceedings of the 10th International Conference on Human Computer Interaction, Jan. 1, 2008, 10 pages.
Nakajima,"Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, Aug. 2001, 8 pages.
Patel,"Applications of Electrically Conductive Yarns in Technical Textiles", International Conference on Power System Technology (POWECON), Oct. 30, 2012, 6 pages.
Poh,"A Medical Mirror for Non-Contact Health Monitoring", In Proceedings: ACM SIGGRAPH Emerging Technologies Available at: <http://affect.media.mit.edu/pdfs/11.Poh-etal-SIGGRAPH.pdf>, 2011, 1 page.
Poh,"Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D18%2D10%2D10762%2EP, May 7, 2010, 13 pages.
Pu,"Whole-Home Gesture Recognition Using Wireless Signals", MobiCom '13 Proceedings of the 19th annual international conference on Mobile computing & networking, Aug. 27, 2013, 12 pages.
Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.
Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
Wijesiriwardana,"Capacitive Fibre-Meshed Transducer for Touch & Proximity Sensing Applications", IEEE Sensors Journal, IEEE Service Center, Oct. 1, 2005, 5 pages.
Zhadobov,"Millimeter-wave Interactions with the Human Body: State of Knowledge and Recent Advances", International Journal of Microwave and Wireless Technologies, Mar. 1, 2011, 11 pages.
Zhang,"Study of the Structural Design and Capacitance Characteristics of Fabric Sensor", Advanced Materials Research (vols. 194-196), Feb. 21, 2011, 8 pages.
"Final Office Action", U.S. Appl. No. 14/959,799, dated Jan. 4, 2018, 17 pages.
"Final Office Action", U.S. Appl. No. 14/959,730, dated Nov. 22, 2017, 16 pages.
"International Search Report and Written Opinion", PCT/US2017/047691, dated Nov. 16, 2017, 13.
"International Search Report and Written Opinion", PCT Application No. PCT/US2017/051663, dated Nov. 29, 2017, 16 pages.
"Non-Final Office Action", U.S. Appl. No. 14/504,121, dated Jan. 2, 2018, 19 pages.
"Non-Final Office Action", U.S. Appl. No. 14/959,901, dated Jan. 8, 2018, 21 pages.
"Non-Final Office Action", U.S. Appl. No. 14/504,139, dated Oct. 18, 2017, 12 pages.
"Non-Final Office Action", U.S. Appl. No. 15/595,649, dated Oct. 31, 2017, 16 pages.
"Non-Final Office Action", U.S. Appl. No. 14/862,409, dated Dec. 14, 2017, 17 pages.
"Notice of Allowance", U.S. Appl. No. 15/403,066, dated Jan. 8, 2018, 18 pages.
"Notice of Allowance", U.S. Appl. No. 14/874,955, dated Oct. 20, 2017, 7 pages.
"Notice of Allowance", U.S. Appl. No. 15/398,147, dated Nov. 15, 2017, 8 pages.
"Notice of Publication", U.S. Appl. No. 15/703,511, dated Jan. 4, 2018, 1 page.
"Restriction Requirement", U.S. Appl. No. 15/362,359, dated Jan. 8, 2018, 5 pages.
Bondade, et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, Sep. 14, 2014, 5 pages.
Fan, et al., "Wireless Hand Gesture Recognition Based on Continuous-Wave Doppler Radar Sensors", IEEE Transactions on Microwave Theory and Techniques, Plenum, USA, vol. 64, No. 11, Nov. 1, 2016 (Nov. 1, 2016), pp. 4012-4012, XP011633246, ISSN: 0018-9480, DOI: 10.1109/TMTT.2016.2610427, Nov. 1, 2016, 9 pages.
Lien, et al., "Soli: Ubiquitous Gesture Sensing with Millimeter Wave Radar", ACM Transactions on Graphics (TOG), ACM, Us, vol. 35, No. 4, Jul. 11, 2016 (Jul. 11, 2016), pp. 1-19, XP058275791, ISSN: 0730-0301, DOI: 10.1145/2897824.2925953, Jul. 11, 2016, 19 pages.
Martinez-Garcia, et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016), pp. 151-160, XP035898949, ISSN: 0925-1030, DOI: 10.1007/S10470-016-0747-8, Apr. 23, 2016, 10 pages.

(56) References Cited

OTHER PUBLICATIONS

Skolnik, "CW and Frequency-Modulated Radar", In: "Introduction to Radar Systems", Jan. 1, 1981 (Jan. 1, 1981), McGraw Hill, XP055047545, ISBN: 978-0-07-057909-5 pp. 68-100, p. 95-p. 97, Jan. 1, 1981, 18 pages.
Zheng, et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, Dec. 9, 2013 (Dec. 9, 2013), p. 3, XP032574214, DOI: 10.1109/IMWS-BIO.2013.6756200, Dec. 9, 2013, 3 Pages.
"Combined Search and Examination Report", GB Application No. 1620892.8, dated Apr. 6, 2017, 5 pages.
"Corrected Notice of Allowance", U.S. Appl. No. 14/930,220, dated Mar. 20, 2017, 2 pages.
"Corrected Notice of Allowance", U.S. Appl. No. 14/930,220, dated May 11, 2017, 2 pages.
"Final Office Action", U.S. Appl. No. 14/518,863, dated May 5, 2017, 18 pages.
"First Action Interview Office Action", U.S. Appl. No. 14/959,901, dated Apr. 14, 2017, 3 pages.
"International Preliminary Report on Patentability", Application No. PCT/US2015/050903, dated Apr. 13, 2017, 12 pages.
"International Search Report and Written Opinion", Application No. PCT/US2016/060399, dated Jan. 30, 2017, 11 pages.
"Non-Final Office Action", U.S. Appl. No. 14/504,038, dated Mar. 22, 2017, 33 pages.
"Non-Final Office Action", U.S. Appl. No. 15/403,066, dated May 4, 2017, 31 pages.
"Pre-Interview Communication", U.S. Appl. No. 15/343,067, dated Apr. 19, 2017, 3 pages.
"Textile Wire Brochure", Retrieved at: http://www.textile-wire.ch/en/home.html, Aug. 7, 2004, 17 pages.
Stoppa,"Wearable Electronics and Smart Textiles: A Critical Review", In Proceedings of Sensors, vol. 14, Issue 7, Jul. 7, 2014, pp. 11957-11992.
"Advisory Action", U.S. Appl. No. 14/504,139, dated Aug. 28, 2017, 3 pages.
"Final Office Action", U.S. Appl. No. 14/959,901, dated Aug. 25, 2017, 19 pages.
"Final Office Action", U.S. Appl. No. 15/403,066, dated Oct. 5, 2017, 31 pages.
"Non-Final Office Action", U.S. Appl. No. 15/093,533, dated Aug. 24, 2017, 18 pages.
"Non-Final Office Action", U.S. Appl. No. 15/142,619, dated Aug. 25, 2017, 16 pages.
"Non-Final Office Action", U.S. Appl. No. 14/959,799, dated Sep. 8, 2017, 16 pages.
"Non-Final Office Action", U.S. Appl. No. 15/398,147, dated Sep. 8, 2017, 7 pages.
"Non-Final Office Action", U.S. Appl. No. 14/518,863, dated Sep. 29, 2017, 20 pages.
"Non-Final Office Action", U.S. Appl. No. 15/142,689, dated Oct. 4, 2017, 18 pages.
"Pre-Interview Office Action", U.S. Appl. No. 14/862,409, dated Sep. 15, 2017, 16 pages.
"Written Opinion", PCT Application No. PCT/US2016/055671, dated Apr. 13, 2017, 8 pages.
"Written Opinion", PCT Application No. PCT/US2017/032733, dated Jul. 26, 2017, 5 pages.
"Final Office Action", U.S. Appl. No. 14/518,863, dated Apr. 5, 2018, 21 pages.
"Final Office Action", U.S. Appl. No. 14/504,139, dated May 1, 2018, 14 pages.
"Final Office Action", U.S. Appl. No. 15/595,649, dated May 23, 2018, 13 pages.
"Final Office Action", U.S. Appl. No. 15/142,689, dated Jun. 1, 2018, 16 pages.
"Final Office Action", U.S. Appl. No. 14/874,955, dated Jun. 11, 2018, 9 pages.
"Final Office Action", U.S. Appl. No. 14/959,901, dated Jun. 15, 2018, 21 pages.
"Final Office Action", U.S. Appl. No. 15/286,152, dated Jun. 26, 2018, 25 pages.
"Final Office Action", U.S. Appl. No. 15/267,181, dated Jun. 7, 2018, 31 pages.
"First Action Interview Office Action", U.S. Appl. No. 15/166,198, dated Apr. 25, 2018, 8 pages.
"Foreign Office Action", European Application No. 16784352.3, dated May 16, 2018, 3 pages.
"Foreign Office Action", Chinese Application No. 201721290290.3, dated Jun. 6, 2018, 3 pages.
"Non-Final Office Action", U.S. Appl. No. 15/287,253, dated Apr. 5, 2018, 17 pages.
"Non-Final Office Action", U.S. Appl. No. 15/586,174, dated Jun. 18, 2018, 7 pages.
"Notice of Allowance", U.S. Appl. No. 14/862,409, dated Jun. 6, 2018, 7 pages.
"Pre-Interview Communication", U.S. Appl. No. 15/362,359, dated May 17, 2018, 4 pages.
"Preliminary Report on Patentability", PCT Application No. PCT/US2016/055671, dated Apr. 10, 2018, 9 pages.
"Written Opinion", PCT Application No. PCT/US2017/032733, dated Jul. 24, 2017, 5 pages.
"Combined Search and Examination Report", GB Application No. 1620891.0, dated May 31, 2017, 9 pages.
"Final Office Action", U.S. Appl. No. 15/398,147, dated Jun. 30, 2017, 11 pages.
"Final Office Action", U.S. Appl. No. 14/874,955, dated Jun. 30, 2017, 9 pages.
"Final Office Action", U.S. Appl. No. 14/959,799, dated Jul. 19, 2017, 12 pages.
"Final Office Action", U.S. Appl. No. 14/504,121, dated Aug. 8, 2017, 16 pages.
"International Search Report and Written Opinion", Application No. PCT/US2016/063874, dated May 11, 2017, 19 pages.
"Non-Final Office Action", U.S. Appl. No. 14/862,409, dated Jun. 22, 2017, 15 pages.
"Non-Final Office Action", U.S. Appl. No. 14/959,730, dated Jun. 23, 2017, 14 pages.
"Notice of Allowance", U.S. Appl. No. 14/513,875, dated Jun. 6, 2017, 7 pages.
"Notice of Allowance", U.S. Appl. No. 15/343,067, dated Jul. 27, 2017, 9 pages.
"Notice of Allowance", U.S. Appl. No. 14/504,038, dated Aug. 7, 2017, 17 pages.
"Notice of Allowance", U.S. Appl. No. 14/494,863, dated May 30, 2017, 7 pages.
"Corrected Notice of Allowance", U.S. Appl. No. 14/312,486, dated Oct. 28, 2016, 4 pages.
"International Search Report and Written Opinion", Application No. PCT/US2016/024289, dated Aug. 25, 2016, 17 pages.
"Non-Final Office Action", U.S. Appl. No. 14/518,863, dated Oct. 14, 2016, 16 pages.
"Notice of Allowance", U.S. Appl. No. 14/582,896, dated Nov. 7, 2016, 5 pages.
"Pre-Interview Communication", U.S. Appl. No. 14/513,875, dated Oct. 21, 2016, 3 pages.
Cheng,"Smart Textiles: From Niche to Mainstream", IEEE Pervasive Computing, Jul. 2013, pp. 81-84.
Farringdon,"Wearable Sensor Badge & Sensor Jacket for Context Awareness", Third International Symposium on Wearable Computers, Oct. 1999, 7 pages.
Pu,"Gesture Recognition Using Wireless Signals", Oct. 2014, pp. 15-18.
Schneegass,"Towards a Garment OS: Supporting Application Development for Smart Garments", Wearable Computers, ACM, Sep. 2014, 6 pages.
"Final Office Action", U.S. Appl. No. 15/286,512, dated Dec. 26, 2018, 15 pages.
"International Preliminary Report on Patentability", PCT Application No. PCT/US2017/032733, dated Nov. 29, 2018, 7 pages.

(56) References Cited

OTHER PUBLICATIONS

"Non-Final Office Action", U.S. Appl. No. 14/959,901, dated Oct. 11, 2018, 22 pages.
"Non-Final Office Action", U.S. Appl. No. 15/287,308, dated Oct. 15, 2018, 18 pages.
"Non-Final Office Action", U.S. Appl. No. 15/286,152, dated Oct. 19, 2018, 27 pages.
"Non-Final Office Action", U.S. Appl. No. 15/286,537, dated Nov. 19, 2018, 18 pages.
"Non-Final Office Action", U.S. Appl. No. 15/287,155, dated Dec. 10, 2018, 12 pages.
"Notice of Allowance", U.S. Appl. No. 15/142,689, dated Oct. 30, 2018, 9 pages.
"Notice of Allowance", U.S. Appl. No. 15/287,200, dated Nov. 6, 2018, 19 pages.
"Written Opinion", PCT Application No. PCT/US2017/051663, dated Oct. 12, 2018, 8 pages.
Gürbüz, et al., "Detection and Identification of Human Targets in Radar Data", Proc. SPIE 6567, Signal Processing, Sensor Fusion, and Target Recognition XVI, 656701, May 7, 2007, 12 pages.
"Apple Watch Used Four Sensors to Detect your Pulse", retrieved from http://www.theverge.com/2014/9/9/6126991 / apple-watch-four-back-sensors-detect-activity on Sep. 23, 2017 in PCT search report for PCT Application No. PCT/US2016/026756 dated Nov. 10, 2017; The Verge, paragraph 1, Sep. 9, 2014, 4 pages.
"Clever Toilet Checks on Your Health", CNN.Com; Technology, Jun. 28, 2005, 2 pages.
"Final Office Action", U.S. Appl. No. 14/681,625, dated Dec. 7, 2016, 10 pages.
"Final Office Action", U.S. Appl. No. 14/731,195, dated Oct. 11, 2018, 12 pages.
"Final Office Action", U.S. Appl. No. 14/715,454, dated Sep. 7, 2017, 14 pages.
"Final Office Action", U.S. Appl. No. 14/720,632, dated Jan. 9, 2018, 18 pages.
"Final Office Action", U.S. Appl. No. 14/715,454, dated Apr. 17, 2018, 19 pages.
"Final Office Action", U.S. Appl. No. 14/599,954, dated Aug. 10, 2016, 23 pages.
"Final Office Action", U.S. Appl. No. 14/699,181, dated May 4, 2018, 41 pages.
"Final Office Action", U.S. Appl. No. 14/715,793, dated Sep. 12, 2017, 7 pages.
"Final Office Action", U.S. Appl. No. 14/809,901, dated Dec. 13, 2018, 7 pages.
"First Action Interview OA", U.S. Appl. No. 14/715,793, dated Jun. 21, 2017, 3 pages.
"First Action Interview Office Action", U.S. Appl. No. 15/142,471, dated Feb. 5, 2019, 29 pages.
"First Action Interview Office Action", U.S. Appl. No. 14/731,195, dated Jun. 21, 2018, 4 pages.
"First Action Interview Pilot Program Pre-Interview Communication", U.S. Appl. No. 14/731,195, dated Aug. 1, 2017, 3 pages.
"First Examination Report", GB Application No. 1621332.4, dated May 16, 2017, 7 pages.
"Foreign Office Action", Chinese Application No. 201580034536.8, dated Oct. 9, 2018.
"Foreign Office Action", KR Application No. 10-2016-7036023, dated Aug. 11, 2017, 10 pages.
"Foreign Office Action", Chinese Application No. 201580036075.8, dated Jul. 4, 2018, 14 page.
"Foreign Office Action", JP App. No. 2016-567813, dated Jan. 16, 2018, 3 pages.
"Foreign Office Action", Korean Application No. 10-2016-7036015, dated Oct. 15, 2018, 3 pages.
"Foreign Office Action", Japanese Application No. 2016-567839, dated Apr. 3, 2018, 3 pages.
"Foreign Office Action", KR Application No. 10-2016-7035397, dated Sep. 20, 2017, 5 pages.
"Foreign Office Action", Korean Application No. 1020187012629, dated May 24, 2018, 6 pages.
"Foreign Office Action", EP Application No. 15170577.9, dated May 30, 2017, 7 pages.
"Foreign Office Action", Korean Application No. 10-2016-7036396, dated Jan. 3, 2018, 7 pages.
"Foreign Office Action", JP Application No. 2016567813, dated Sep. 22, 2017, 8 pages.
"Foreign Office Action", Japanese Application No. 2018021296, dated Dec. 25, 2018, 8 pages.
"Foreign Office Action", EP Application No. 15754323.2, dated Mar. 9, 2018, 8 pages.
"Foreign Office Action ", CN Application No. 201580034908.7, dated Jul. 3, 2018, 12 pages.
"International Preliminary Report on Patentability", PCT Application No. PCT/US2016/026756, dated Oct. 19, 2017, 8 pages.
"International Search Report and Written Opinion", PCT Application No. PCT/US2016/065295, dated Mar. 14, 2017, 12 pages.
"International Search Report and Written Opinion", Application No. PCT/US2016/042013, dated Oct. 26, 2016, 12 pages.
"International Search Report and Written Opinion", Application No. PCT/US2016/034366, dated Nov. 17, 2016, 13 pages.
"International Search Report and Written Opinion", Application No. PCT/US2016/033342, dated Oct. 27, 2016, 20 pages.
"Life:X Lifestyle eXplorer", Retrieved from <https://web.archive.org/web/20150318093841/http://research.microsoft.com/en-us/projects/lifex >, Feb. 3, 2017, 2 pages.
"Non-Final Office Action", U.S. Appl. No. 15/596,702, dated Jan. 4, 2019, 10 pages.
"Non-Final Office Action", U.S. Appl. No. 14/666,155, dated Feb. 3, 2017, 12 pages.
"Non-Final Office Action", U.S. Appl. No. 14/809,901, dated May 24, 2018, 13 pages.
"Non-Final Office Action", U.S. Appl. No. 14/720,632, dated Jun. 14, 2017, 16 pages.
"Non-Final Office Action", U.S. Appl. No. 14/715,454, dated Jan. 11, 2018, 16 pages.
"Non-Final Office Action", U.S. Appl. No. 14/599,954, dated Jan. 6, 2017, 16 pages.
"Non-Final Office Action", U.S. Appl. No. 14/599,954, dated Feb. 2, 2016, 17 pages.
"Non-Final Office Action", U.S. Appl. No. 14/720,632, dated May 18, 2018, 20 pages.
"Non-Final Office Action", U.S. Appl. No. 14/699,181, dated Oct. 18, 2017, 33 pages.
"Non-Final Office Action", U.S. Appl. No. 14/681,625, dated Mar. 6, 2017, 7 pages.
"Non-Invasive Quantification of Peripheral Arterial Volume Distensibilitiy and its Non-Lineaer Relationship with Arterial Pressure", Journal of Biomechanics, Pergamon Press, vol. 42, No. 8; in the search report for PCT/US2016/013968 the whole document, but in particular the abstract, dated May 29, 2009, 2 pages.
"Notice of Allowance", U.S. Appl. No. 14/599,954, dated May 24, 2017, 11 pages.
"Notice of Allowance", U.S. Appl. No. 14/715,793, dated Jul. 6, 2018, 5 pages.
"Notice of Allowance", U.S. Appl. No. 15/286,495, dated Jan. 17, 2019, 5 pages.
"Notice of Allowance", U.S. Appl. No. 15/595,649, dated Jan. 3, 2019, 5 pages.
"Notice of Allowance", U.S. Appl. No. 14/715,793, dated Dec. 18, 2017, 5 pages.
"Notice of Allowance", U.S. Appl. No. 14/666,155, dated Feb. 20, 2018, 5 pages.
"Notice of Allowance", U.S. Appl. No. 14/666,155, dated Jul. 10, 2017, 7 pages.
"Notice of Allowance", U.S. Appl. No. 14/681,625, dated Jun. 7, 2017, 7 pages.
"Notice of Allowance", U.S. Appl. No. 14/681,625, dated Oct. 23, 2017, 8 pages.
"Notice of Allowance", U.S. Appl. No. 15/142,829, dated Feb. 6, 2019, 8 pages.

(56) References Cited

OTHER PUBLICATIONS

"Notice of Allowance", U.S. Appl. No. 14/504,137, dated Feb. 6, 2019, 9 pages.
"Pre-Interview Communication", U.S. Appl. No. 15/142,471, dated Dec. 12, 2018, 3 pages.
"Pre-Interview Communication", U.S. Appl. No. 14/715,793, dated Mar. 20, 2017, 3 pages.
"Pre-Interview Communication", U.S. Appl. No. 14/715,454, dated Apr. 14, 2017, 3 pages.
"Pre-Interview Office Action", U.S. Appl. No. 14/731,195, dated Dec. 20, 2017, 4 pages.
"Preliminary Report on Patentability", PCT Application No. PCT/US2016/065295, dated Jul. 24, 2018, 18 pages.
"Preliminary Report on Patentability", PCT Application No. PCT/US2016/042013, dated Jan. 30, 2018, 7 pages.
"Preliminary Report on Patentability", PCT Application No. PCT/US2016/032307, dated Dec. 7, 2017, 9 pages.
"Pressure-Volume Loop Analysis in Cardiology", retrieved from https://en.wikipedia.org/w/index.php?title=Pressure-volume loop analysis in card iology&oldid=636928657 on Sep. 23, 2017; Obtained per link provided in search report from PCT/US2016/01398 dated Jul. 28, 2016, Dec. 6, 2014, 10 pages.
"Restriction Requirement", U.S. Appl. No. 15/462,957, dated Jan. 4, 2019, 6 pages.
"Restriction Requirement", U.S. Appl. No. 15/352,194, dated Feb. 6, 2019, 8 pages.
"The Dash smart earbuds play back music, and monitor your workout", Retrieved from < http://newatlas.com/bragi-dash-tracking-earbuds/30808/>, Feb. 13, 2014, 3 pages.
"Thermofocus No Touch Forehead Thermometer", Technimed, Internet Archive. Dec. 24, 2014. https://web.archive.org/web/20141224070848/http://www.tecnimed.it:80/thermofocus-forehead-thermometer-H1N1-swine-flu.html, Dec. 24, 2018, 4 pages.
"Written Opinion", PCT Application No. PCT/US2016/042013, dated Feb. 2, 2017, 6 pages.
"Written Opinion", PCT Application No. PCT/US2016/026756, dated Nov. 10, 2016, 7 pages.
"Written Opinion", PCT Application No. PCT/US2016/065295, dated Apr. 13, 2018, 8 pages.
"Written Opinion", PCT Application PCT/US2016/013968, dated Jul. 28, 2016, 9 pages.
Antonimuthu, "Google's Project Soli brings Gesture Control to Wearables using Radar", YouTube[online], Available from https://www.youtube.com/watch?v=czJfcgvQcNA as accessed on May 9, 2017; See whole video, especially 6:05-6:35.
Duncan, David P. "Motion Compensation of Synthetic Aperture Radar", Microwave Earth Remote Sensing Laboratory, Brigham Young University, Apr. 15, 2003, 5 pages.
Ishijima, Masa "Unobtrusive Approaches to Monitoring Vital Signs at Home", Medical & Biological Engineering and Computing, Springer, Berlin, DE, vol. 45, No. 11 in search report for PCT/US2016/013968 dated Jul. 28, 2016, Sep. 26, 2007, 3 pages.
Klabunde, Richard E. "Ventricular Pressure-Volume Loop Changes in Valve Disease", Retrieved From <https://web.archive.org/web/20101201185256/http://cvphysiology.com/Heart%20Disease/HD009.htm>, Dec. 1, 2010, 8 pages.

Kubota, Yusuke et al., "A Gesture Recognition Approach by using Microwave Doppler Sensors", IPSJ SIG Technical Report, 2009 (6), Information Processing Society of Japan, Apr. 15, 2010, pp. 1-8, Apr. 15, 2010, 13 pages.
Matthews, Robert J. "Venous Pulse", Retrieved at: http://www.rjmatthewsmd.com/Definitions/venous_pulse.htm—on Nov. 30, 2016, Apr. 13, 2013, 7 pages.
Otto, Chris et al., "System Architecture of a Wireless Body Area Sensor Network for Ubiquitous Health Monitoring", Journal of Mobile Multimedia; vol. 1, No. 4, Jan. 10, 2006, 20 pages.
Palese, et al., "The Effects of Earphones and Music on the Temperature Measured by Infrared Tympanic Thermometer: Preliminary Results", ORL—head and neck nursing: official journal of the Society of Otorhinolaryngology and Head-Neck Nurses 32.2, Jan. 1, 2013, pp. 8-12.
Pu, Qifan et al., "Whole-Home Gesture Recognition Using Wireless Signals", MobiCom'13, Sep. 30-Oct. 4, Miami, FL, USA, 2013, 12 pages.
Pu, Qifan et al., "Whole-Home Gesture Recognition Using Wireless Signals", Proceedings of the 19th annual international conference on Mobile computing & networking (MobiCom'13), US, ACM, Sep. 30, 2013, pp. 27-38, Sep. 30, 2013, 12 pages.
Zhadobov, Maxim et al., "Millimeter-Wave Interactions with the Human Body: State of Knowledge and Recent Advances", International Journal of Microwave and Wireless Technologies, p. 1 of 11, Cambridge University Press and the European Microwave Association, 2011; doi:10.1017/S1759078711000122, 2011.
"Final Office Action", U.S. Appl. No. 15/287,308, dated Feb. 8, 2019, 23 pages.
"Final Office Action", U.S. Appl. No. 15/287,155, dated Apr. 10, 2019, 11 pages.
"Final Office Action", U.S. Appl. No. 15/287,253, dated Apr. 2, 2019, 10 pages.
"Foreign Office Action", Japanese Application No. 2018501256, dated Feb. 26, 2019, 3 pages.
"Non-Final Office Action", U.S. Appl. No. 15/166,198, dated Feb. 21, 2019, 48 pages.
"Non-Final Office Action", U.S. Appl. No. 15/287,394, dated Mar. 22, 2019, 39 pages.
"Non-Final Office Action", U.S. Appl. No. 16/238,464, dated Mar. 7, 2019, 15 pages.
"Notice of Allowance", U.S. Appl. No. 15/286,152, dated Mar. 5, 2019, 23 pages.
"Notice of Allowance", U.S. Appl. No. 15/703,511, dated Apr. 16, 2019, 5 pages.
"Notice of Allowance", U.S. Appl. No. 15/286,512, dated Apr. 9, 2019, 14 pages.
"Pre-Interview Communication", U.S. Appl. No. 15/703,511, dated Feb. 11, 2019, 5 pages.
Garmatyuk, et al., "Ultra-Wideband Continuous-Wave Random Noise Arc-SAR", IEEE Transaction on Geoscience and Remote Sensing, vol. 40, No. 12, Dec. 2002, Dec. 2002, 10 pages.
Geisheimer, et al., "A Continuous-Wave (CW) Radar for Gait Analysis", IEEE 2001, 2001, 5 pages.

* cited by examiner

RADAR GESTURE SENSING USING EXISTING DATA PROTOCOLS

PRIORITY APPLICATION

This application claims priority under 35 U.S.C. § 119(e) to U.S. Provisional Patent Application No. 62/237,975, entitled "Signal Processing and Gesture Recognition" and filed on Oct. 6, 2015, the disclosure of which is incorporated in its entirety by reference herein.

BACKGROUND

Use of gestures to interact with computing devices has become increasingly common. Gesture recognition techniques have successfully enabled gesture interaction with devices when these gestures are made to device surfaces, such as touch screens for phones and tablets and touch pads for desktop computers. Users, however, are more and more often desiring to interact with their devices through gestures not made to a surface, such as a person waving an arm to control a video game. These in-the-air gestures can be sensed using radar techniques by devices that emit a radar field and analyze reflections of that radar field. The device emitting the radar field controls modulation and transmission of the radar field, which enables the device to correlate radar reflections to the modulations of the radar field. In some applications, multiple devices may benefit from radar gesture recognition, but another device, which does not emit the radar field, lacks access to the control information for the modulation and transmission of the radar field to perform radar gesture sensing.

SUMMARY

This document describes techniques and devices for radar gesture sensing using existing data protocols. These techniques and devices can accurately recognize gestures that are made in three dimensions, such as in-the-air gestures. These in-the-air gestures can be made from varying distances, such as from a person sitting on a couch to control a television, a person standing in a kitchen to control an oven or refrigerator, or millimeters from a desktop computer's display.

Data protocols used for wireless communication define information included in transmissions, such as a training sequence that is used for receiver synchronization and/or channel estimation. All radios using the data protocol transmit the training sequence as a part of each data transmission. By modulating a radar field according to an existing data protocol, the known data pattern of the training sequence can be used to correlate reflections of the radar field for radar gesture sensing, while concurrently using the radar field for data transmission.

In addition to the transmitting device using the radar field for gesture sensing, any receiving device that uses the same existing data protocol can use the reflections of the radar field, which are modulated with the training sequence, for radar gesture recognition. The receiving device may be receiving data transmissions from the transmitting device using the data protocol, or may simply be using the radar field for gesture sensing. For example the data protocol may be used for point-to-point communication between the transmitting device and the receiving device, the transmitting device may be an access point that provides a radar field that multiple receiving devices can use for gesture sensing, and so forth.

This summary is provided to introduce simplified concepts concerning radar gesture sensing using existing data protocols, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for radar gesture sensing using existing data protocols are described with reference to the following drawings. The same numbers are used throughout the drawings to reference like features and components.

DETAILED DESCRIPTION

Overview

This document describes techniques using, and devices embodying, radar gesture sensing using existing data protocols. These techniques and devices can enable a great breadth of gestures and uses for those gestures, such as gestures to use, control, and interact with various devices, from desktop computers to refrigerators. The techniques and devices are capable of providing a radar field that can sense gestures from multiple actors at one time and through obstructions, thereby improving gesture breadth and accuracy over many conventional techniques. These devices incorporate gesture recognition with the transmission and/or reception of data using an existing data protocol. This approach allows a device to use a single radio to both transmit data to another device and to emit a radar field for gesture sensing, eliminating the need for dedicated radios for data transmission and for gesture sensing.

Additionally radar gesture sensing is employed in a device that analyzes reflections of radio waves corresponding to known patterns of a data protocol used to receive data. By analyzing the reflections of these known patterns, such as a training sequence in a transmitted data packet, radar-gesture recognition is enabled in a device without requiring the device to include a radar emitter.

Example Environment

Figure 1:
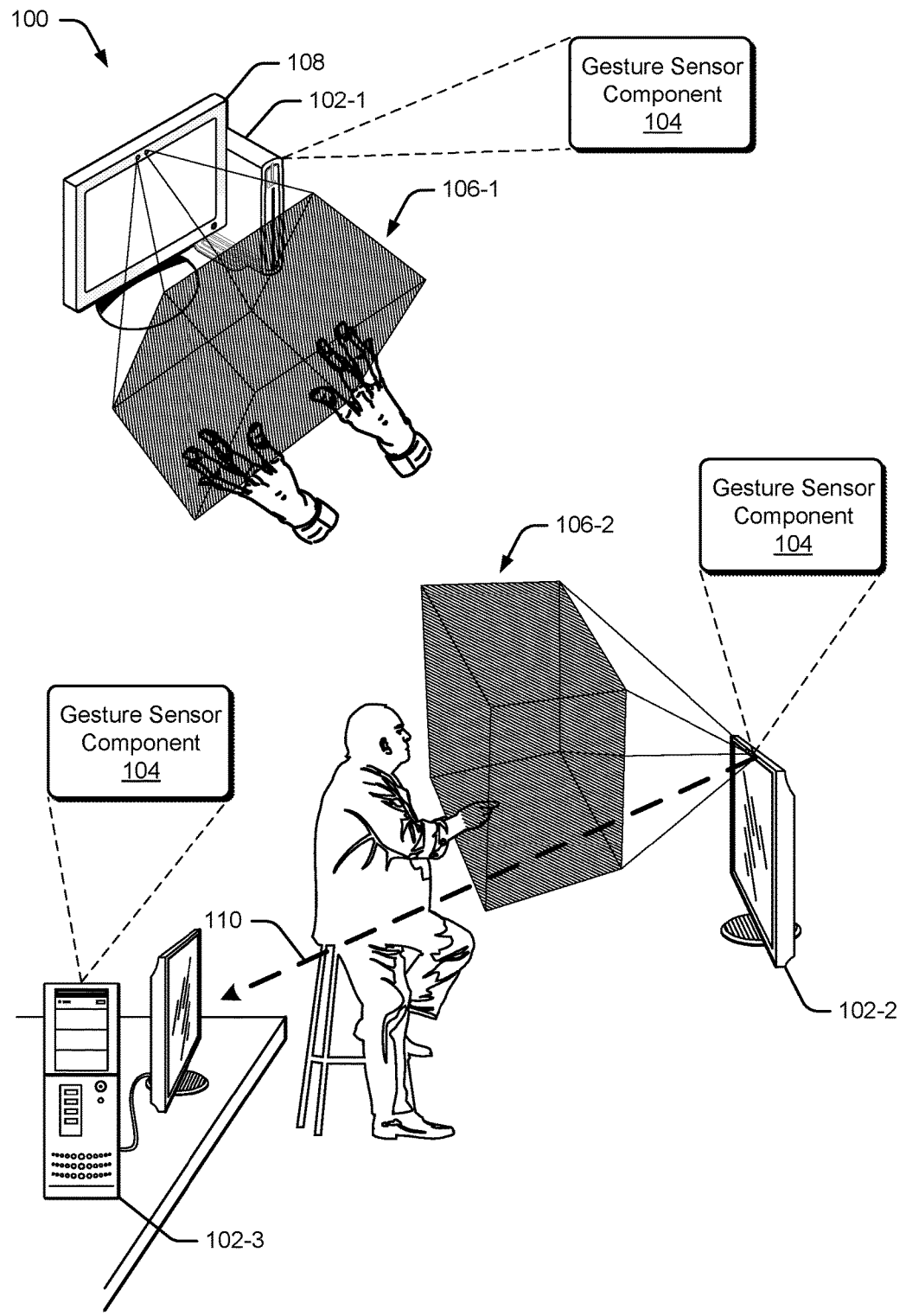
FIG. 1 illustrates an example environment that employs radar gesture sensing using existing data protocols in accordance with one or more implementations.

FIG. 1 is an illustration of example environment 100 in which techniques using, and an apparatus including, radar gesture sensing using existing data protocols may be embodied. Environment 100 includes example computing devices 102 devices that each include a gesture component 104. In computing device 102-1, the gesture sensor component 104 provides a near radar field to interact with the computing device 102-1 and in computing device 102-2, the gesture sensor component 104 provides an intermediate radar field (e.g., a room size) to interact with computing device 102-2. The gesture sensor components 104 in the computing devices 102-1 and 102-2 provide radar fields 106, near radar field 106-1 and intermediate radar field 106-2, and are described below.

The gesture sensor component 104 in computer system 102-1 improves user interaction with desktop computer 102-1. Assume, for example, that computer system 102-1 includes a touch screen 108 through which display and user interaction can be performed. This touch screen 108 can present some challenges to users, such as needing a person to sit in a particular orientation, such as upright and forward, to be able to touch the screen. Further, the size for selecting controls through touch screen 108 can make interaction difficult and time-consuming for some users. Consider, however, computer system 102-1, which provides near radar field 106-1 enabling a user's hands to interact with computer system 102-1, such as with small or large, simple or complex gestures, including those with one or two hands, and in three dimensions. As is readily apparent, a large volume through which a user may make selections can be substantially easier and provide a better experience over a flat surface, such as that of touch screen 108.

Similarly, consider computer system 102-2, which provides intermediate radar field 106-2, which enables a user to interact with computer system 102-2 from a distance and through various gestures, from hand gestures, to arm gestures, to full-body gestures. By so doing, user selections can be made simpler and easier than a flat surface (e.g., touch screen 108), a remote control (e.g., a gaming or television remote), and other conventional control mechanisms.

The gesture sensor component 104 can interact with applications or an operating system of the computing devices 102, or remotely through a communication network by transmitting input responsive to recognizing gestures. Gestures can be mapped to various applications and devices, thereby enabling control of many devices and applications. Many complex and unique gestures can be recognized by gesture sensor component 104, thereby permitting precise and/or single-gesture control, even for multiple applications. Gesture sensor component 104, whether integrated with a computing device, having computing capabilities, or having few computing abilities, can each be used to interact with various devices and applications.

Figure 2:
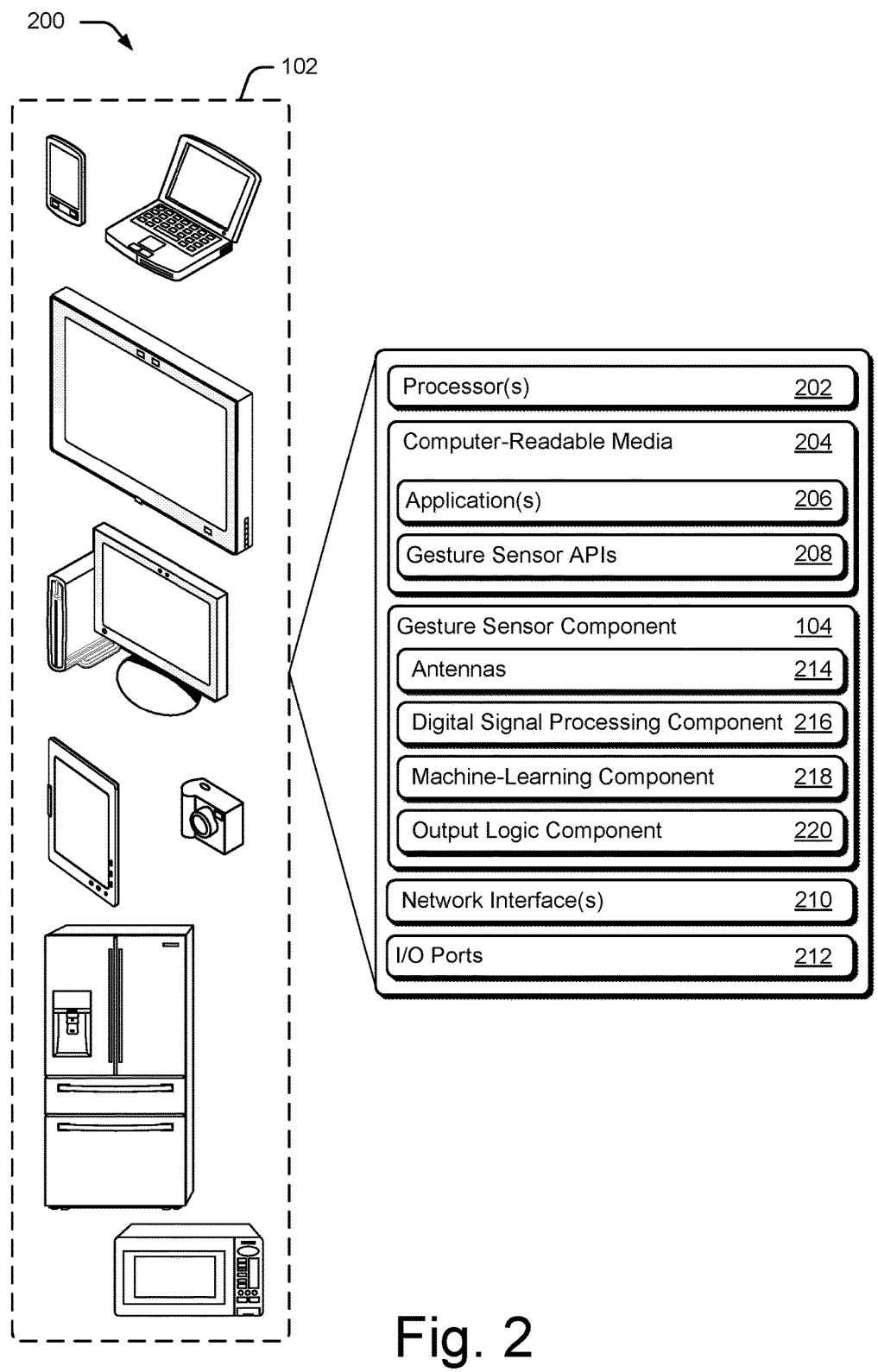
FIG. 2 illustrates an example implementation of a computing device of FIG. 1 in greater detail in accordance with one or more implementations.

FIG. 2 depicts a system 200 in an example implementation in which the gesture component 104 is shown in greater detail. The gesture sensor component 104 is part of one of the computing devices 102. Computing device 102 is illustrated with various non-limiting example devices, such as a smartphone, a laptop computer, a television, a desktop computer, a tablet, a digital camera, a refrigerator, and a microwave oven, though other devices may also be used, such as home automation and control systems, entertainment systems, audio systems, other home appliances, security systems, netbooks, smartphones, and e-readers. Note that computing device 102 can be wearable, non-wearable but mobile, or relatively immobile (e.g., desktops and appliances).

Note also that the gesture sensor component 104 can be used with, or embedded within, many different computing devices or peripherals, such as in walls of a home to control home appliances and systems (e.g., automation control panel), in automobiles to control internal functions (e.g., volume, cruise control, or even driving of the car), or as an attachment to a laptop computer to control computing applications on the laptop.

Computing device 102 includes one or more computer processors 202 and computer-readable media 204, which includes memory media and storage media. Application(s) 206, gesture sensor APIs 208 and/or an operating system (not shown) are embodied as computer-readable instructions on computer-readable media 204 can be executed by processors 202 to provide some of the functionalities described herein.

Computing device 102 may also include network interface(s) 210 for communicating data over wired, wireless, or optical networks. By way of example and not limitation, network interface 210 may communicate data over a local area network (LAN), a wireless local area network (WLAN), a personal area network (PAN), a wide area network (WAN), an intranet, the Internet, a peer-to-peer network, point-to-point network, a mesh network, and the like.

Computing device 102 also includes I/O ports 212. I/O ports 212 can include a variety of ports, such as by way of example and not limitation, high-definition multimedia (HDMI), digital video interface (DVI), display port, fiber-optic or light-based, audio ports (e.g., analog, optical, or digital), Universal Serial Bus (USB) ports, serial advanced technology attachment (SATA) ports, peripheral component interconnect (PCI) express based ports or card slots, serial ports, parallel ports, or other legacy ports.

Results are output from the gesture sensor component 104 to applications 206 via the gesture sensor APIs 208 and may be configured in a variety of ways. In a first such example, the result references the identified gesture, but not how the gesture was detected. In this way, detection of the gesture by the gesture sensor component 104 may be abstracted away from the applications 206 such that the applications 206 are not aware of how the gesture is detected, but may leverage detection of the gesture to control operations of the computing device 102.

In some implementations, gesture sensor APIs 208 provide high-level access into the gesture component 104 in order to abstract implementation details and/or hardware access from a calling application 206, request notifications related to identified events, query for results, and so forth. Gesture sensor APIs 208 can also provide low-level access to gesture component 104, where a calling application 206 can control direct or partial hardware configuration of the gesture component 104. In some cases, gesture sensor APIs 208 provide programmatic access to input configuration parameters that configure transmit signals (e.g., signals as described in relation to FIG. 4) and/or select gesture recognition algorithms.

These gesture sensor APIs 208 enable applications 206 to incorporate the functionality provided by the gesture component 104 into executable code. For instance, applications 206 can call or invoke gesture sensor APIs 208 to register for, or request, an event notification when a particular gesture has been detected, enable or disable wireless gesture recognition in computing device 102, and so forth. At times, gesture sensor APIs 208 can access and/or include low level hardware drivers that interface with hardware implementations of gesture component 104. Alternately or additionally, gesture sensor APIs 208 can be used to access various algorithms that reside on gesture component 104 to perform additional functionality or extract additional information, such as 3D tracking information, angular extent, reflectivity profiles from different aspects, correlations between transforms/features from different channels, and so forth.

In an example, the gesture sensor component 104 employs the gesture sensor APIs 208 to expose a result that describes an operation that is to be performed by the computing device 102. In an implementation, this may be performed to identify the operation and even an amount to which the operation is to be performed. Further, this may be done so without indication of the gesture used to specify this operation. For example, the gesture sensor component 104 detects a gesture performed by a hand that mimics the turning of a physical knob. Detection of the gesture by the gesture sensor component 104 includes positioning of fingers of the user's hand in three-dimensional space as well as detection of movement, which in this instance involves rotational movement to the left or right.

The result output by the gesture sensor component 104 via the APIs 208 to the application 206 may be configured in a variety of ways. In a first such example, the result references the identified gesture, but not how the gesture was detected. In this way, detection of the gesture by the gesture sensor component 104 may be abstracted away from the applications 206 such that the applications 206 are not aware of how the gesture is detected, but may leverage detection of the gesture to control operations of the computing device 102.

Gesture sensor component 104, as noted above, is configured to sense gestures. To enable this, the gesture sensing component 104 includes antennas 214, digital signal processing component 216, machine-learning component 218, and output logic component 220. In some implementations, gesture sensor component 104 uses these various components in concert (such as a pipeline) to wirelessly detect gestures using radar techniques based on multiple signals, such as micro-gestures.

Antennas 214, for instance, are used transmit and receive RF signals, such as emitting a radar field and receiving reflections of the radar field. This is achieved by converting electrical signals into electromagnetic waves for transmission, and vice versa for reception. The gesture sensor component 104 can include any suitable number of antennas 214 in any suitable configuration. For instance, any of the antennas 214 can be configured as a dipole antenna, a parabolic antenna, a helical antenna, a monopole antenna, and so forth. In some examples, antennas 214 are constructed on-chip (e.g., as part of an SoC), while in other examples, antennas 214 are components, metal, hardware, and so forth that attach to the gesture sensor component 104. The placement, size, and/or shape of antennas 214 can be chosen to enhance a specific transmission pattern or diversity scheme, such as a pattern or scheme designed to capture information about a micro-gesture performed by the hand, as further described above and below. The antennas 214 can be physically separated from one another by a distance that allows the gesture sensor component 104 to collectively transmit and receive signals directed to a target object (e.g., a hand) over different channels, different radio frequencies, and different distances. In some instances, antennas 214 are spatially distributed to support triangulation techniques, while in others the antennas are collocated to support beamforming techniques. While not illustrated, each antenna 214 can correspond to a respective transceiver path that physically routes and manages the outgoing signals for transmission and the incoming signals for capture and analysis.

Digital signal processing component 216 generally represents functionality that digitally captures and processes a signal. For instance, digital signal processing component 216 performs sampling on RF signals received by antennas 214 to generate digital samples that represent the RF signals, and processes the digital samples to extract information about the target object. Alternately or additionally, digital signal processing component 216 controls the configuration of signals transmitted via antennas 214, such as configuring a plurality of signals to form a specific diversity scheme, such as a beamforming diversity scheme. In some cases, digital signal processing component 216 receives input configuration parameters that control an RF signal's transmission parameters (e.g., frequency channel, power level, etc.), such as through gesture sensor APIs 208. In turn, digital signal processing component 216 modifies the RF signal based upon the input configuration parameter. At times, the signal processing functions of digital signal processing component 216 are included in a library of signal processing functions or algorithms that are also accessible and/or configurable via gesture sensor APIs 208. Digital signal processing component 216 can be implemented in hardware, software, firmware, or any combination thereof.

Additionally or alternatively, the digital signal processing component 216 modulates data for transmission on the RF signals that are transmitted and/or demodulates data on received RF signals. The emitted radiation by the antennas 214 provides the radar field for gesture sensing, as well as transmitting wireless data. By way of example and not limitation, the protocol may a wireless local area network (WLAN) protocol, a personal area network (PAN) protocol, a wide area network (WAN) protocol, a peer-to-peer network protocol, point-to-point network protocol, a mesh network protocol, and the like.

Among other things, machine-learning component 218 receives information processed or extracted by digital signal processing component 216, and uses that information to classify or recognize various aspects of the target object, as further described below. In some cases, machine-learning component 218 applies one or more algorithms to probabilistically determine which gesture has occurred given an input signal and previously learned gesture features by leveraging the gesture sensor APIs 208. As in the case of digital-signal processing component 216, machine-learning component 218 can include a library of multiple machine-learning algorithms as part of the gesture sensor APIs 208, such as a Random Forrest algorithm, deep learning algorithms (e.g., artificial neural network algorithms, convolutional neural net algorithms, etc.), clustering algorithms, Bayesian algorithms, and so forth.

Machine-learning component 218 can be trained on how to identify various gestures using input data that consists of example gestures to learn. In turn, machine-learning component 218 uses the input data to learn what features can be attributed to a specific gesture. These features are then used to identify when the specific gesture occurs. An operation may also be assigned to the gesture as part of the gesture sensor APIs 208 to expose this operation to the applications 206 as previously described in relation to FIG. 2. In some examples, gesture sensor APIs 208 can be used to configure machine-learning component 218 and/or its corresponding algorithms.

Output logic component 220 represents functionality that uses logic to filter output information generated by digital signal processing component 216 and machine-learning component 218. In some cases, output logic component 220 uses knowledge about the target object to further filter or identify the output information. For example, consider a case where the target object is a hand repeatedly performing a tap gesture. Depending upon its configuration, output logic component 220 can filter the repeated tap gesture into a single output event indicating a repeated tap gesture, or repeatedly issue a single-tap gesture output event for each tap gesture identified. This can be based on knowledge of the target object, user input filtering configuration information, default filtering configuration information, and other information defined as part of the gesture sensor APIs 208. In some implementations, the filtering configuration information of output logic component 220 can be modified via the gesture sensor APIs 208.

Having described computing device 102 in accordance with one or more embodiments, now consider a discussion of using wireless detection of an object in accordance with one or more examples.

Generally, antennas 214 are configured to emit a radar field, in some cases one that is configured to penetrate fabric or other obstructions and reflect from human tissue. These fabrics or obstructions can include wood, glass, plastic, cotton, wool, nylon and similar fibers, and so forth, while reflecting from human tissues, such as a person's hand In some cases, the radar field configuration can include the modulation of data on the emitted radar field according to a data protocol as further described below.

This radar field can be a small size, such as zero or one or so millimeters to 1.5 meters, or an intermediate size, such as about one to about 30 meters. In the intermediate size, antennas 214 or digital signal processing component 216 are configured to receive and process reflections of the radar field to provide large-body gestures based on reflections from human tissue caused by body, arm, or leg movements, though smaller and more-precise gestures can be sensed as well. Example intermediate-sized radar fields include those in which a user makes gestures to control a television from a couch, change a song or volume from a stereo across a room, turn off an oven or oven timer (a near field would also be useful here), turn lights on or off in a room, and so forth.

Antennas 214 can instead be configured to provide a radar field from little if any distance from a computing device or its display. An example near field is illustrated in FIG. 1 at near radar field 106-1 and is configured for sensing gestures made by a user using a laptop, desktop, refrigerator water dispenser, and other devices where gestures are desired to be made near to the device.

Antennas 214 can be configured to emit continuously modulated radiation, ultra-wideband radiation, or sub-millimeter-frequency radiation. Antennas 214, in some cases, is configured to form radiation in beams, the beams aiding digital signal processing component 216 to determine which of the beams are interrupted, and thus locations of interactions within the radar field.

In an example in FIG. 1, the computer system 102-2 is configured to emit a radar field and to transmit wireless data modulated on the radar field (shown by the dashed line at 110) to computer system 102-3. In computer system 102-3, a gesture sensing component 104 or a transceiver is configured to receive wireless data and the gesture sensor component 104 is configured to use reflected portions of the transmitted wireless data signal to sense gestures, as described in detail above and below. Since the computer system 102-3 uses radio signals emitted by the computer system 102-2, the computer system 102-3 may be configured with or without the capability to radiate a radar field.

Additionally or alternately, the computer system 102-3 can transmit an indication of the gesture determined by the computer system 102-3 to the computer system 102-2 that emitted the radar field. The indication can be transmitted in any suitable way, such as via a network connection, as a part of or in addition to acknowledging the receipt of wireless data according to the data protocol in use, and so forth.

These and other capabilities and configurations, as well as ways in which entities of FIGS. 1 and 2 act and interact, are set forth in greater detail below. These entities may be further divided, combined, and so on. The environment 100 of FIG. 1 and the detailed illustrations of FIG. 2 illustrates some of many possible environments and devices capable of employing the described techniques.

Data Protocols

Figure 3:
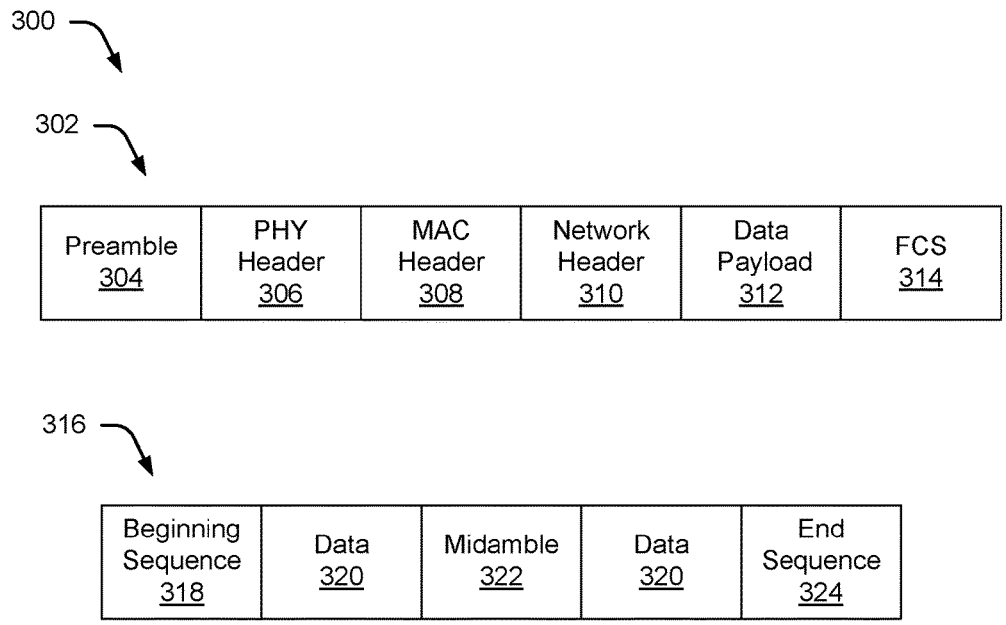
FIG. 3 illustrates example structures of data packets usable for radar gesture sensing using existing data protocols.

FIG. 3 illustrates an example packet structures 300 used for wireless data communication for the example environment 100 in which various embodiments of radar gesture sensing using existing data protocols can be implemented. Generally, wireless packet data communication systems are defined using a layered model or network stack, such as the Open Systems Interconnection (OSI) model. Functions of the communication system are defined with respect to these layers to specify the protocols for how communications between devices are implemented. Layered models and network stacks are well known and a detailed discussion is beyond the scope of this application. The use of a layered model for communication results in transmitting data packets that include a number of fields. Each layer in the model receives data from the layer above, processes the received data, and adds additional information, typically as a header before passing the header and received data to the next lower layer.

For example, a data packet 302 includes a preamble field 304, a physical layer (PHY) header field 306, a media access layer (MAC) header field 308, a network layer header field 310, a data payload field 312 and a frame check sequence (FCS) field 314. The preamble field 304 includes information such as a training sequence that is a known bit or symbol pattern transmitted with every packet. The training sequence is used in various purposes, such as synchronizing the receiver to the timing of the received data packet, estimating channel conditions to compensate for fading conditions between the transmitter and receiver, and so forth.

The PHY header 306 includes information useful to the receiver in receiving and demodulating the data packet, such as the length of the data packet 302. The MAC header 308 includes encoding/decoding information that describes how the data packet being transmitted are encoded and decoded into bits as part of a transmission protocol. The network header 310 includes information that specifies how the data being transferred to a destination node is routed. The data payload field 312 includes data, such as data from an application that is being transferred in the data packet 302. The FCS field 314 includes integrity check information, such as a checksum, a cyclical redundancy check (CRC), or a message integrity check hash value, that is used by the receiving device to determine if the data payload 312 was corrupted during transmission.

The order, type, and presence/absence of particular fields may differ between communication systems without affecting the ability of the gesture sensing component 104 to use a data protocol for gesture recognition. For example, a data packet 316 includes a beginning sequence field 318, data fields 320, a midamble 322, and an ending sequence 324. The midamble 322 includes information similar to the preamble 304, such as the training sequence.

Propagation of RF Signals

Figure 4:
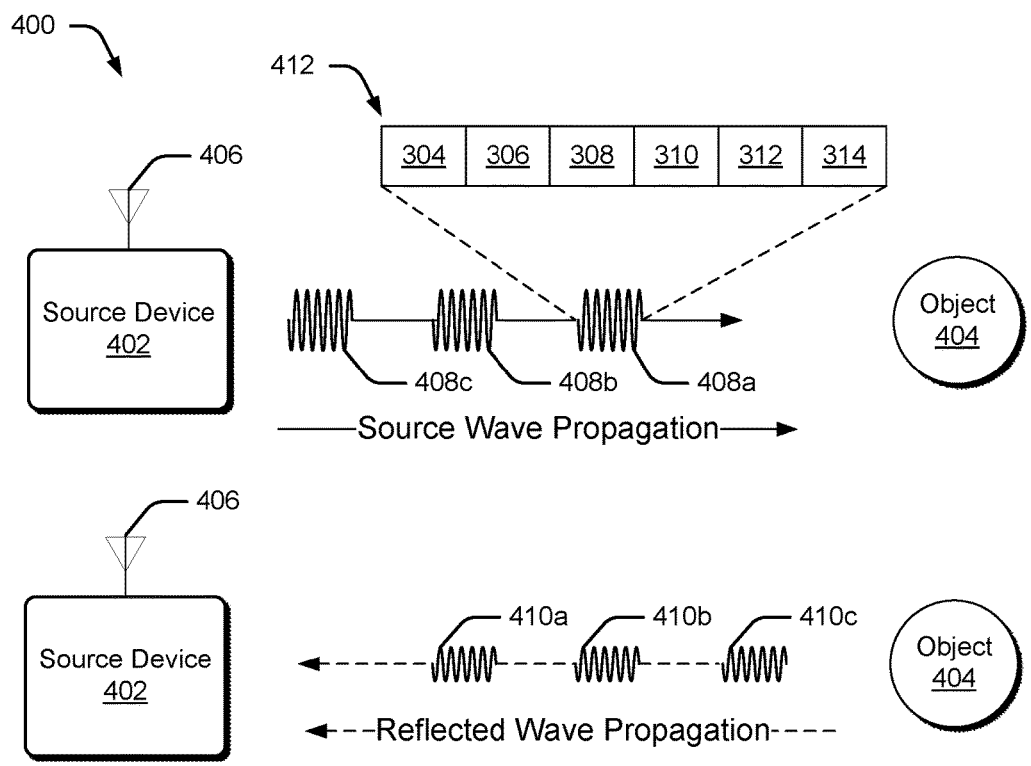
FIG. 4 illustrates an example of general signal properties of radar signals.

FIG. 4 illustrates a simple example of RF wave propagation, and a corresponding reflected wave propagation. It is to be appreciated that the following discussion has been simplified, and is not intended to describe all technical aspects of RF wave propagation, reflected wave propagation, or detection techniques.

Environment 400 includes source device 402 and object 404. Source device 402 includes antenna 406, which is configured to transmit and receive electromagnetic waves in the form of an RF signal. In this example, source device 402 transmits a series of RF pulses, illustrated here as RF pulse 408a, RF pulse 408b, and RF pulse 408c. As indicated by their ordering and distance from source device 402, RF pulse 408a is transmitted first in time, followed by RF pulse 408b, and then RF pulse 408c. For discussion purposes, these RF pulses have the same pulse width, power level, and transmission periodicity between pulses, but any other suitable type of signal with alternate configurations can be transmitted without departing from the scope of the claimed subject matter.

Generally speaking, electromagnetic waves can be characterized by the frequency or wavelength of their corresponding oscillations. Being a form of electromagnetic radiation, RF signals adhere to various wave and particle properties, such as reflection. When an RF signal reaches an object, it will undergo some form of transition. Specifically, there will be some reflection off the object. Environment 400 illustrates the reflection of RF pulses 408a-408c reflecting off of object 404, where RF pulse 410a corresponds to a reflection originating from RF pulse 408a reflecting off of object 404, RF pulse 410b corresponds to a reflection originating from RF pulse 410b, and so forth. In this simple case, source device 402 and object 404 are stationary, and RF pulses 408a-408c are transmitted via a single antenna (antenna 406) over a same RF channel, and are transmitted directly towards object 404 with a perpendicular impact angle. Similarly, RF pulses 410a-410c are shown as reflecting directly back to source device 402, rather than with some angular deviation. However, as one skilled in the art will appreciate, these signals can alternately be transmitted or reflected with variations in their transmission and reflection directions based upon the configuration of source device 402, object 404, transmission parameters, variations in real-world factors, and so forth. Upon receiving and capturing RF pulses 410a-410c, source device 402 can then analyze the pulses, either individually or in combination, to identify characteristics related to object 404. For example, source device 402 can analyze all of the received RF pulses to obtain temporal information and/or spatial information about object 404. Accordingly, source device 402 can use knowledge about a transmission signal's configuration (such as pulse widths, spacing between pulses, pulse power levels, phase relationships, and so forth), and further analyze a reflected RF pulse to identify various characteristics about object 404, such as size, shape, movement speed, movement direction, surface smoothness, material composition, and so forth.

As discussed above, the source device 402 can be configured to emit continuously modulated radiation, ultra-wideband radiation, or sub-millimeter-frequency radiation for radar gesture sensing. The source device 402 can also be configured to use a data protocol to transmit data, in which case one or more portions of the transmitted data is used for radar gesture sensing. For example at 412, the source device 402 transmits a source wave modulated with the data packet 302. Upon receiving and capturing RF pulses 410a-410c, source device 402 can then analyze the entire pulses or the one or more portions of the pulses, such as analyzing the portion that corresponds to the preamble 304 of the data packet, to identify characteristics related to object 404.

Figure 5:
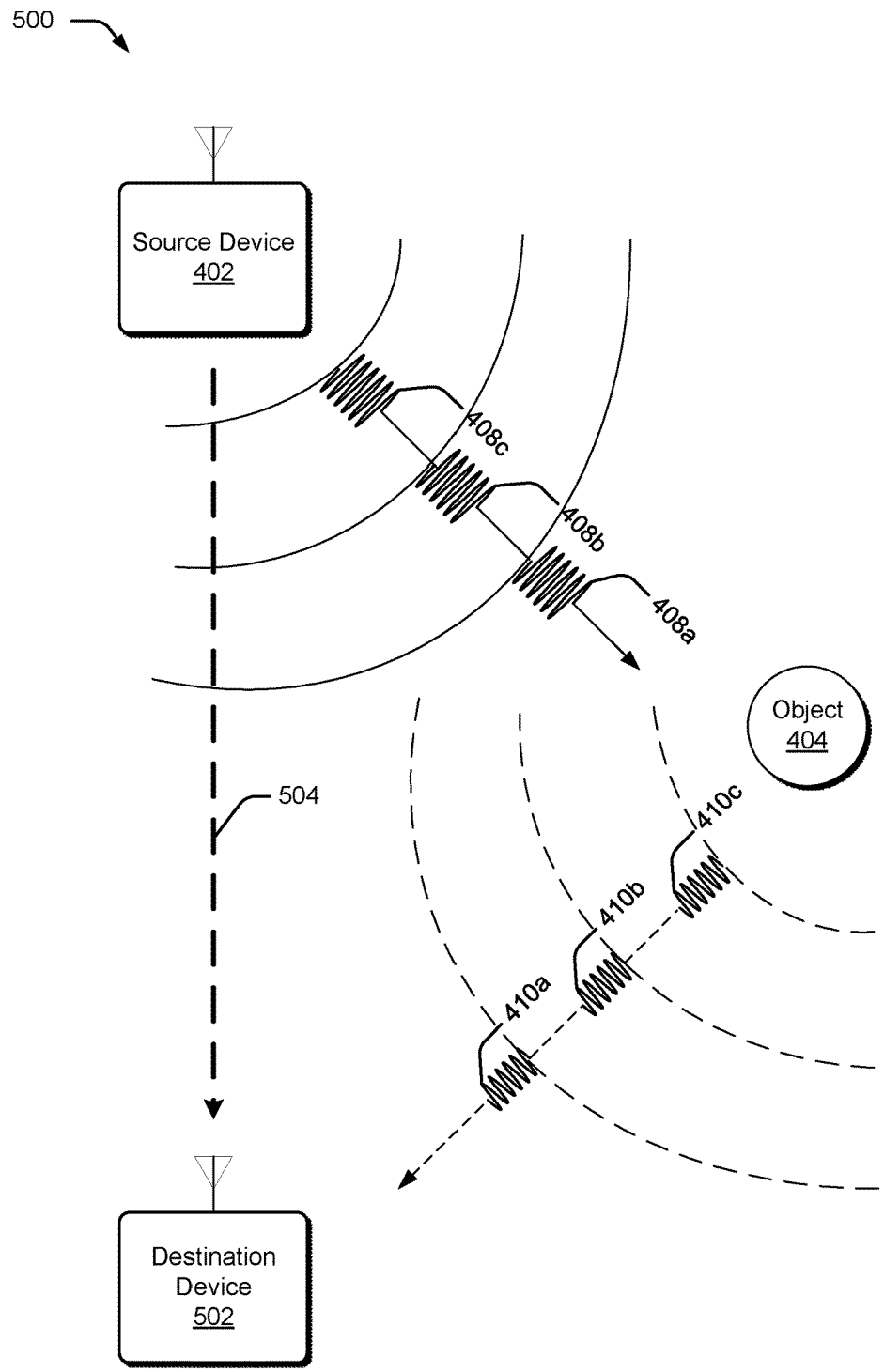
FIG. 5 illustrates an additional example of general signal properties of radar signals for radar gesture sensing using existing data protocols.

FIG. 5 illustrates another example of RF wave propagation, and a corresponding reflected wave propagation. It is to be appreciated that the following discussion has been simplified, and is not intended to describe all technical aspects of RF wave propagation, reflected wave propagation, or detection techniques.

Environment 500 includes source device 402, object 404, and destination device 502. Source device 402 is configured to transmit data to destination device 502 using a known data protocol (shown at 504) such as a data protocol that uses the data packet 302. The beamwidth of RF signals transmitted from the source device 402 are sufficiently wide to transmit data to the destination device 502, as well as to illuminate the object 404 for radar gesture sensing.

Environment 500 illustrates the reflection of RF pulses 408a-408c reflecting off of object 404, where RF pulse 410a corresponds to a reflection originating from RF pulse 408a reflecting off of object 404, RF pulse 410b corresponds to a reflection originating from RF pulse 410b, and so forth. Similarly, RF pulses 410a-410c are shown as reflecting off the object 404 with angular deflection toward the destination device 502. Upon receiving and capturing RF pulses 410a-410c, destination device 502 can then analyze the pulses, either individually or in combination, to identify characteristics related to object 404. Additionally, RF pulses 410a-410c may also be reflected back to the source device 402 (not shown for visual brevity) and analyzed as described above with respect for FIG. 4.

Destination device 502 can also be configured to use a data protocol to receive data and/or use one or more portions of the reflections of a transmitted data for radar gesture sensing. The source device 402 and the destination device 502 communicate using a common data protocol. Although many fields in the data packets will vary in each packet, such as the data payload 312 and the FCS 314, there are fields that are identical in each packet, such as the preamble 304 or a training sequence. For example, the destination device 502 can use the training sequence in the RF pulses 410a-410c for radar gesture sensing, as the training sequence is identical in each data packet transmitted in accordance with the data protocol.

The training sequence of a data protocol can be modified to improve gesture sensing performance. By way of example and not limitation, parameters of the training sequence, such as the length of the training sequence, the modulation code, the chip rate, the number of repetitions of the sequence, and so forth, can be modified to achieve a desired radar resolution and signal-to-noise ratio (SNR) that optimize gesture sensing performance.

Additionally or alternatively, a field can be added to the fields defined by the existing data protocol to improve gesture sensing performance. For example, a postamble field can be added following the FCS field 314 of the data packet 302. To receive data, a receiver uses the fields defined by the existing data protocol and ignores the postamble. The postamble can be used for gesture sensing and the bit pattern in the postamble can be optimized for gesture sensing performance, as described above.

The destination device may use a combination of fields within a data packet for radar gesture recognition. For example, the source device 402 and destination device 502 are communicating in a session in an environment where other devices are also transmitting with the same data protocol. The destination device 502 may use portions of the data packet 302 to differentiate the transmissions and reflections related to the source device 402 from those of the other devices. The data protocol defines addressing information, such as source and/or destination addresses. The data protocol also defines the location of the addressing information in the data packet, such as in the PHY header 306, MAC header 308, or network header 310. For example, the destination device 502 may use the training sequence along with source and/or destination addressing information in the data packet to identify that the reflected RF pulses 410a-410c correspond to transmissions from the source device 402 and are not reflections from transmissions by another device.

Figure 6:
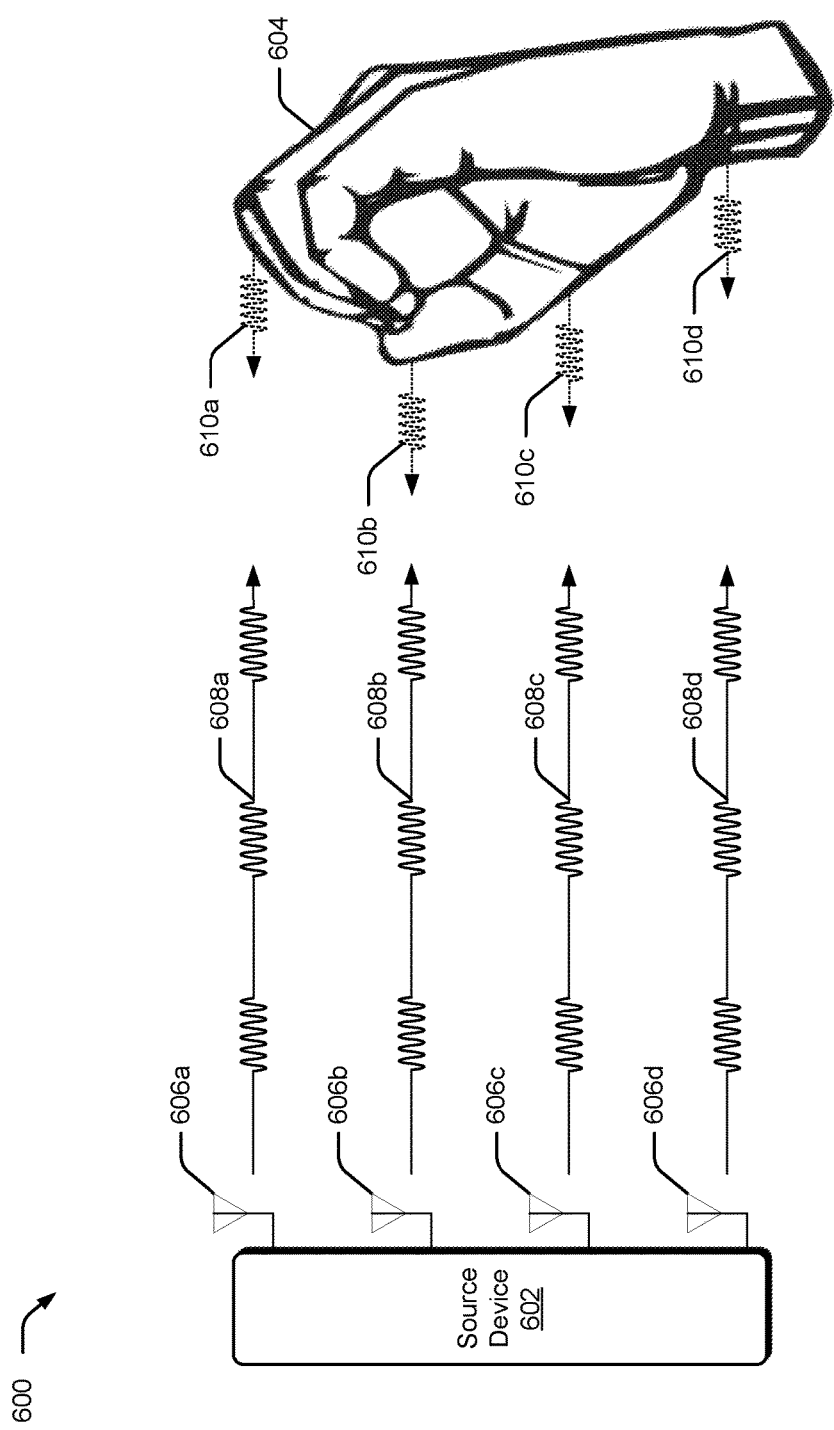
FIG. 6 illustrates an additional example of general signal properties of radar signals using multiple antennas.

Now consider FIG. 6, which builds upon the above discussion of FIG. 4. FIG. 6 illustrates example environment 600 in which multiple antenna are used to ascertain information about a target object. Environment 600 includes source device 602 and a target object, shown here as hand 604. Generally speaking, source device 602 includes antennas 606a-606d to transmit and receive multiple RF signals. In some embodiments, source device 602 includes gesture component 104 of FIGS. 1 and 2 and antennas 606a-606d correspond to antennas 214. While source device 602 in this example includes four antennas, it is to be appreciated that any suitable number of antennas can be used. Each antenna of antennas 606a-606d is used by source device 602 to transmit a respective RF signal (e.g., antenna 606a transmits RF signal 608a, antenna 606b transmits RF signal 608b, and so forth). As discussed above, these RF signals can be configured to form a specific transmission pattern or diversity scheme when transmitted together. For example, the configuration of RF signals 608a-608d, as well as the placement of antennas 606a-606d relative to a target object, can be based upon beamforming techniques to produce constructive interference or destructive interference patterns, or alternately configured to support triangulation techniques. At times, source device 602 configures RF signals 608a-608d based upon an expected information extraction algorithm, as further described below.

When RF signals 608a-608d reach a hand 604, the signals generate reflected RF signals 610a-610d. Similar to the discussion of FIGS. 4 and 5 above, source device 602 and/or destination device 502 captures these reflected RF signals, and then analyzes them to identify various properties or characteristics of hand 604, such as a micro-gesture. For instance, in this example, RF signals 608a-608d are illustrated with the bursts of the respective signals being transmitted synchronously in time. In turn, and based upon the shape and positioning of hand 604, reflected signals 610a-610d return to source device 602 at different points in time (e.g., reflected signal 610b is received first, followed by reflected signal 610c, then reflected signal 610a, and then reflected signal 610d). Reflected signals 610a-610d can be received by source device 602 in any suitable manner. For example, antennas 606a-606d can each receive all of reflected signals 610a-610d, or receive varying subset combinations of reflected signals 610a-610d (i.e. antenna 606a receives reflected signal 610a and reflected signal 610d, antenna 606b receives reflected signal 610a, reflected signal 610b, and reflected signal 610c, etc.). Thus, each antenna can receive reflected signals generated by transmissions from another antenna. By analyzing the various return times of each reflected signal, source device 602 can determine shape and corresponding distance information associated with hand 604. When reflected pulses are analyzed over time, source device 602 can additionally discern movement. Thus, by analyzing various properties of the reflected signals, as well as the transmitted signals, various information about hand 604 can be extracted, as further described below. It is to be appreciated that the above example has been simplified for discussion purposes, and is not intended to be limiting.

As in the case of FIG. 4, FIG. 6 illustrates RF signals 608a-608d as propagating at a 90° angle from source device 602 and in phase with one another. Similarly, reflected signals 610a-610d each propagate back at a 90° angle from hand 604 and, as in the case of RF signals 608a-608d, are in phase with one another. However, as one skilled in the art will appreciate, more complex transmission signal configurations, and signal analysis on the reflected signals, can be utilized, examples of which are provided above and below. In some embodiments, RF signals 608a-608d can each be configured with different directional transmission angles, signal phases, power levels, modulation schemes, RF transmission channels, and so forth. These differences result in variations between reflected signals 610a-610d. In turn, these variations each provide different perspectives of the target object which can be combined using data fusion techniques to yield a better estimate of hand 604, how it is moving, its three dimensional (3D) spatial profile, a corresponding micro-gesture, and so forth.

Having described general principles of RF signals which can be used in gesture detection, now consider a discussion of various forms of information extraction that can be employed in accordance with one or more embodiments.

Wireless Detection of Gestures

The above discussion describes simple examples of RF signal transmission and reflection. In the case of using multiple antenna, it can be seen how transmitting a plurality of RF signals that have variations from one another results in receiving diverse information about a target object from the corresponding reflected signals. The diverse information can then be combined to improve detecting a characteristic or gesture associated with the target object. Accordingly, the system as a whole can exploit or optimize which signals are transmitted to improve the amount of information that can be extracted from the reflected signals. Some embodiments of a gesture sensor component 104 capture raw data representative of signals reflected off a target object. In turn, digital-signal processing algorithms extract information from the raw data, which can then be fed to a machine-learning algorithm to classify a corresponding behavior of the target object. At times, the gesture sensor component utilizes a pipeline to identify or classify a gesture.

Figure 7:
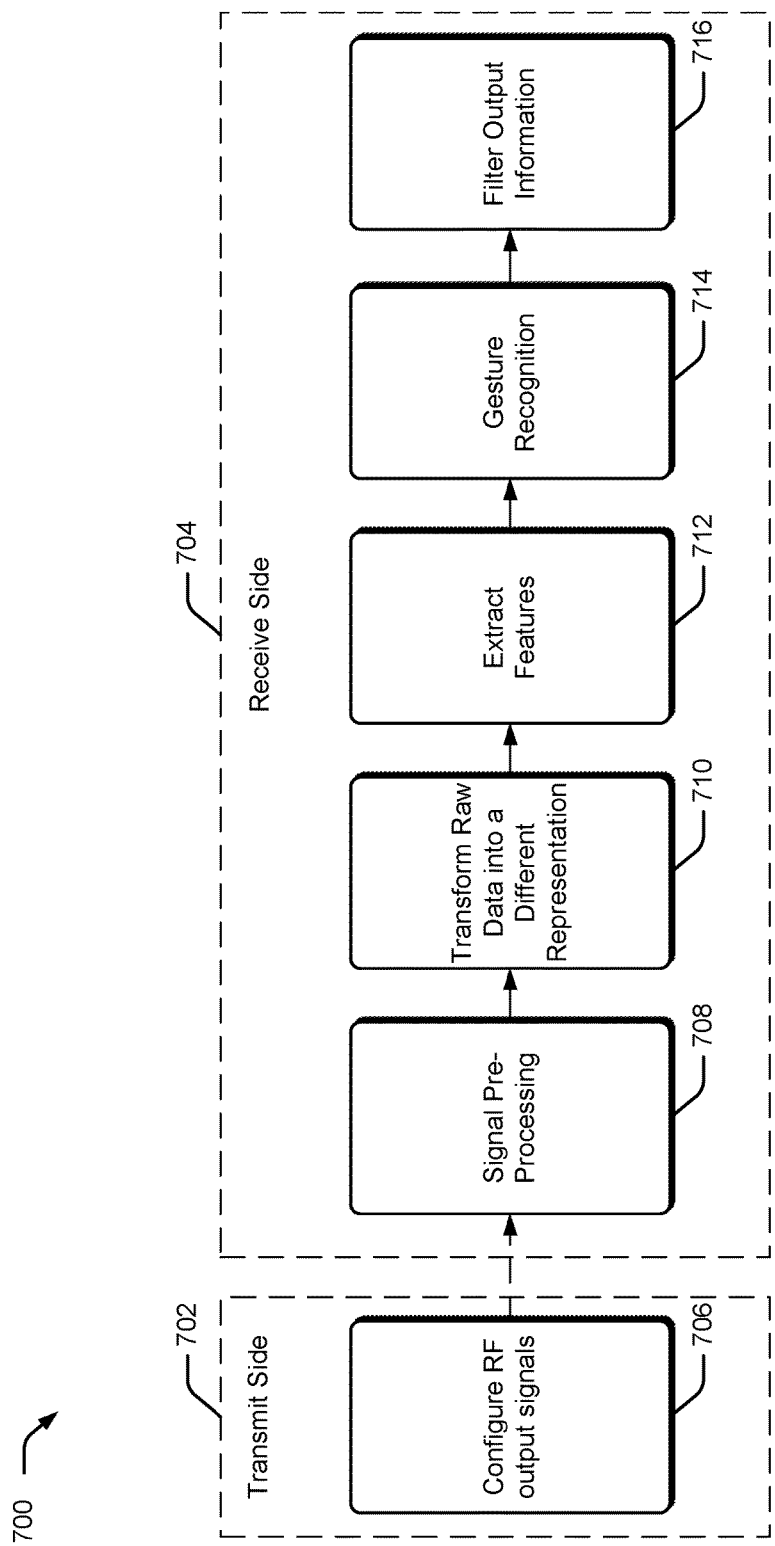
FIG. 7 illustrates an example of a pipeline in accordance with one or more implementations.

FIG. 7 illustrates the various stages employed by an example pipeline 700 to identify gestures and expose operations to be controlled by those gestures to applications. In some implementations, pipeline 700 can be implemented by various components of gesture component 104 of FIGS. 1 and 2, such as antennas 214, digital signal processing component 216, machine-learning component 218, and/or output logic component 220. It is to be appreciated that these stages have been simplified for discussion purposes, and are not intended to be limiting.

From one viewpoint, the stages can be grouped into two classifications: transmit side functionality 702 and receive side functionality 704. Generally speaking, the transmit side functionality in the pipeline does not feed directly into the receive side functionality. Instead, the transmit side functionality generates transmit signals which contribute to the reflected signals captured and processed by the receive side functionality, as further described above. Accordingly, the relationship between the transmit side functionality and the receive side functionality is indicated in pipeline 700 through the use of a dotted line to connect stage 706 of the pipeline with stage 708, rather than a solid line, since in various embodiments they are not directly connected with one another. As illustrated in FIG. 5 the transmit side of the pipeline 700 may be in a transmitting device, such as source device 402 and the receive side of the pipeline may be in a receiving device, such as destination device 502.

Stage 706 of the pipeline configures the RF transmit signals. In some cases, various transmission parameters are determined in order to generate the RF transmit signals. At times, the transmission parameters can be based upon an environment in which they are being used. For instance, the transmission parameters can be dependent upon a number of antenna available, the types of antenna available, a target object being detected, directional transmission information, a requested detection resolution, a long range object detection mode, a short range object detection mode, an expected receive-side digital signal processing algorithm, an expected receive-side machine-learning algorithm, physical antenna placement, and so forth. As noted above, the configuration of the RF transmit signals can be dependent upon an expected analysis on the receive side. Thus, the configuration of the RF transmit signals can change to support triangulation location detection methods, beamforming detection methods, and so forth. In some examples, the transmission parameters are automatically selected or loaded at startup (e.g., the RF transmit signal configurations are fixed). In other examples, these parameters are modifiable, such as through gesture sensor APIs 208.

Additionally, stage 706 of the pipeline configures the RF signals to transmit data according to a data protocol. For example, stage 706 modulates the RF signals with data for transmission according to the modulation and transmission parameters specified by the data protocol. Control of the data transmissions and providing data for transmission from applications is provided through APIs, such as the gesture sensor APIs 208.

At the start of receive side functionality 704, stage 708 performs signal pre-processing on raw data. For example, as an antenna receives reflected signals (e.g., antennas 606a-606d receiving some or all of reflected signals 610a-610d of FIG. 6), some instances sample the signals and generate a digital representation of the raw incoming signals. Upon generating the raw data, stage 708 performs pre-processing to clean up the signals or generate versions of the signals in a desired frequency band, or in a desired format. In some cases, pre-processing includes filtering the raw data to reduce a noise floor or remove aliasing, resampling the data to obtain to a different sample rate, generating a complex representation of the signal(s), and so forth. In some cases, stage 708 automatically pre-processes the raw data based upon default parameters, while in other cases the type of pre-processing is modifiable, such as through gesture sensor APIs 208.

Stage 710 transforms the received signal data into one or more different representations. Here, the signals pre-processed by stage 708 are fed into stage 710. At times, stage 710 combines data from multiple paths (and corresponding antenna). The combined data can be any combination of "transmit paths," "receive paths," and "transmit and receive paths." Any suitable type of data fusion technique can be used, such as weighted integration to optimize a heuristic (e.g., signal-to-noise (SNR) ratio, minimum mean square error (MMSE), etc.), beamforming, triangulation, and so forth. All respective paths can be combined together, or various sub-combinations of paths can be made, to generate combined signal data.

Additionally, stage 708 and/or stage 710 of the pipeline recovers data modulated on the RF signals according to the data protocol. For example, stage 708 and/or stage 710 demodulate the RF signals to recover transmitted data according to parameters specified by the data protocol. Control of the data reception and providing data received data to applications is provided through APIs, such as the gesture sensor APIs 208.

In some implementations, stage 710 generates multiple combinations of signal data for different types of feature extraction, and/or transforms the signal data into another representation as a precursor to feature extraction. For example, some embodiments process the combined signal data to generate a three dimensional (3D) spatial profile of the target object. However, any suitable type of algorithm can be used to generate a transformed view or version of the raw data, such as an I/Q transformation that yields a complex vector containing phase and amplitude information related to the target object, a beamforming transformation that yields a spatial representation of target objects within range of a gesture sensor device, a Range-Doppler algorithm that yields target velocity and direction, a Range profile algorithm that yields target recognition information, a Micro-Doppler algorithm that yields high-resolution target recognition information, a Spectogram algorithm that yields a visual representation of the corresponding frequencies, and so forth.

As described above, raw data can be processed in several ways to generate several transformations or combined signal data. At times, the same data can be analyzed or transformed in multiple ways. For instance, a same capture of raw data can be processed to generate a three-dimensional profile, target velocity information, and target directional movement information. In addition to generating transformations of the raw data, stage 710 can perform basic classification of the target object, such as identifying information about its presence, a shape, a size, an orientation, a velocity over time, and so forth. For example, some implementations use stage 710 to identify a basic orientation of a hand by measuring an amount of reflected energy off of the hand over time. These transformations and basic classifications can be performed in hardware, software, firmware, or any suitable combination. At times, the transformations and basic classifications are performed by digital signal processing component 216 and/or machine-learning component 218 of FIG. 2. In some cases, stage 710 automatically transforms the raw data or performs a basic classification based upon default parameters, while in other cases the transformations or classifications are modifiable, such as through gesture sensor APIs 208.

Stage 712 receives the transformed representation of the data from stage 710, and extracts or identifies features using the data. At times, feature extraction builds upon a basic classification identified in stage 710. Consider the above example in which stage 710 classifies a target object as a hand Stage 712 can build from this basic classification to extract lower resolution features of the hand In other words, if stage 712 is provided information identifying the target object as a hand, then stage 712 uses this knowledge to look for hand-related features (e.g., finger tapping, shape gestures, swipe movements, etc.) instead of head-related features, (e.g., an eye blink, mouthing a word, a head-shaking movement, etc.).

As another example, consider a scenario where stage 710 transforms the raw signal data into a measure of the target object's velocity-over-time. In turn, this information can be used by stage 712 to identify a finger fast-tap motion by using a threshold value to compare the target object's velocity of acceleration to the threshold value, a slow-tap feature, and so forth. Any suitable type of algorithm can be used to extract a feature, such as machine-learning algorithms implemented by machine-learning component 218, and/or digital signal processing algorithms implemented by digital signal processing component 216 of FIG. 2. Some implementations simply apply a single algorithm to extract, identify, or classify a feature, while other embodiments apply multiple algorithms to extract a single feature or multiple features. Thus, different algorithms can be applied to extract different types of features on a same set of data, or different sets of data. In some cases, stage 712 searches for a default feature using default algorithms, while in other cases the applied algorithms and/or the feature being searched for is modifiable, such as through gesture senor APIs 208.

Using feature extraction information generated by stage 712, stage 714 performs gesture recognition using a gesture library. For instance, consider a case where a finger tap feature has been extracted. Stage 714 uses this information and compares it to descriptions of gestures to identify the feature as a double-click micro-gesture. At times, gesture recognition can be a probabilistic determination of which gesture has most likely occurred based upon the input information and how this information relates to one or more previously learned characteristics or features of various gestures. For example, a machine-learning algorithm can be used to determine how to weight various received characteristics to determine a likelihood these characteristics correspond to particular gestures (or components of the gestures). As in the case above, some implementations apply a single algorithm to recognize a gesture, while other embodiments apply multiple algorithms to identify a single gesture or multiple gestures. This can include micro-gestures or macro-gestures. Further, any suitable type of algorithm can be used to identify a gesture, such as machine-learning algorithms implemented by machine-learning component 218, and/or digital signal processing algorithms implemented by digital signal processing component 216 of FIG. 2. In some examples, stage 714 uses default algorithms to identify a gesture, while in other cases the applied algorithms and/or the gesture being identified is modifiable, such as through gesture sensor APIs 208.

From the identified gesture, stage 714 may also identify an operation that corresponds to the gesture and even a degree to which the gesture is to be performed for operations having quantitative features. The gesture library, for instance, may map the gestures to respective operations to be performed upon detection of the gesture. This may also be used to map amounts that are to be used to perform the operations, such as to raise or lower volume, a scrolling amount, and so forth. Stage 716 then exposes an indication of this operation, as well as the mapped amount as appropriate, via the gesture sensor APIs 208 for receipt by the applications 206 of FIG. 2. The applications 206 may then control performance of the operations of the computing device 102, e.g., to initiate or continue an operation, set an amount in which to perform an operation, and so forth.

Pipeline 700 provides an ability to detect gestures, e.g., micro-gestures or macro-gestures. This can include movements based on portions of a target object, rather than the whole target object. Consider again the example case of a target object that is a hand. On a whole, the hand, or portions of the hand, can be in a stationary position while other portions of the hand, such as one or more fingers, are moving. The above described techniques can be used to not only identify a stationary hand, but portions of the hand that are moving, such as two fingers rubbing together. Thus, a micro-gesture can entail identifying a first portion of the hand as being stationary, and identifying a second portion of the hand as having movement relative to the stationary portion.

Example Methods

Example methods 800 and 900 are described with reference to respective FIGS. 8 and 9 in accordance with one or more embodiments of the radar gesture sensing using existing data protocols. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 8:
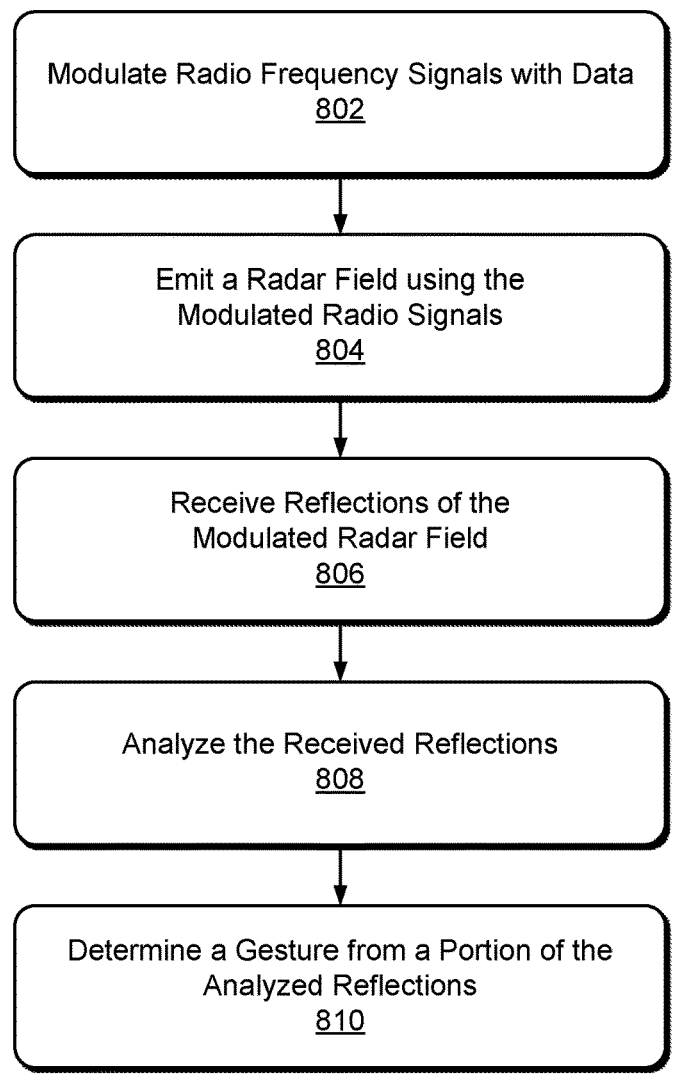
FIG. 8 illustrates an example flow diagram in accordance with one or more implementations.

FIG. 8 illustrates example method(s) 800 of radar gesture sensing using existing data protocols as generally related to sensing gestures from radar reflections. The order in which the method blocks are described are not intended to be construed as a limitation, and any number of the described method blocks can be combined in any order to implement a method, or an alternate method.

At 802 radio frequency (RF) signals are modulated with data. For example, the gesture sensor component 104 or the transmit side functionality 702 of the pipeline 700 modulate the RF output signals according to an existing data protocol used for communication.

At 804, a radar field is emitted using the modulated RF signals. For example, the gesture sensor component 104 or the transmit side functionality 702 of the pipeline 700 configure RF signals for the radar field. The antennas 214 emit the radar field using the modulated RF signals configured by the gesture sensor component 104 or the transmit side functionality 702 of the pipeline 700.

At 806, reflections of the modulated radar field are received. For example, the antennas 214 receive reflections of the modulated radar field for an interaction that occurs in the radar field. The antennas 214 provide RF signals from the received reflections to the receive side functionality 704 of the pipeline 700 or the digital signal processing component 216.

At 808, the received reflections are analyzed. For example, the receive side functionality 704 of the pipeline 700 or the digital signal processing component 216 captures and processes the RF signals. For instance, digital signal processing component 216 performs sampling on RF signals received by antennas 214 to generate digital samples that represent the RF signals, and processes the digital samples to extract information about the target that caused the reflections. The digital signal processing component 216 or the receive side functionality 704 of the pipeline 700 can process the RF signals to identify fields of the data packet 302 that were modulated onto the radar field. The digital signal processing component 216 or the receive side functionality 704 of the pipeline 700 can selectively provide digital samples corresponding to one or more of the identified fields for successive processing to determine a gesture.

At 810, the gesture is determined using a portion of the received reflections. For example, the receive side functionality 704 of the pipeline 700 or the machine-learning component 218 uses that information in the processed signals to classify or recognize various aspects of the target object. The output logic component 220 may further filter output information generated by digital signal processing component 216 and machine-learning component 218 to further refine the gesture determination.

Figure 9:
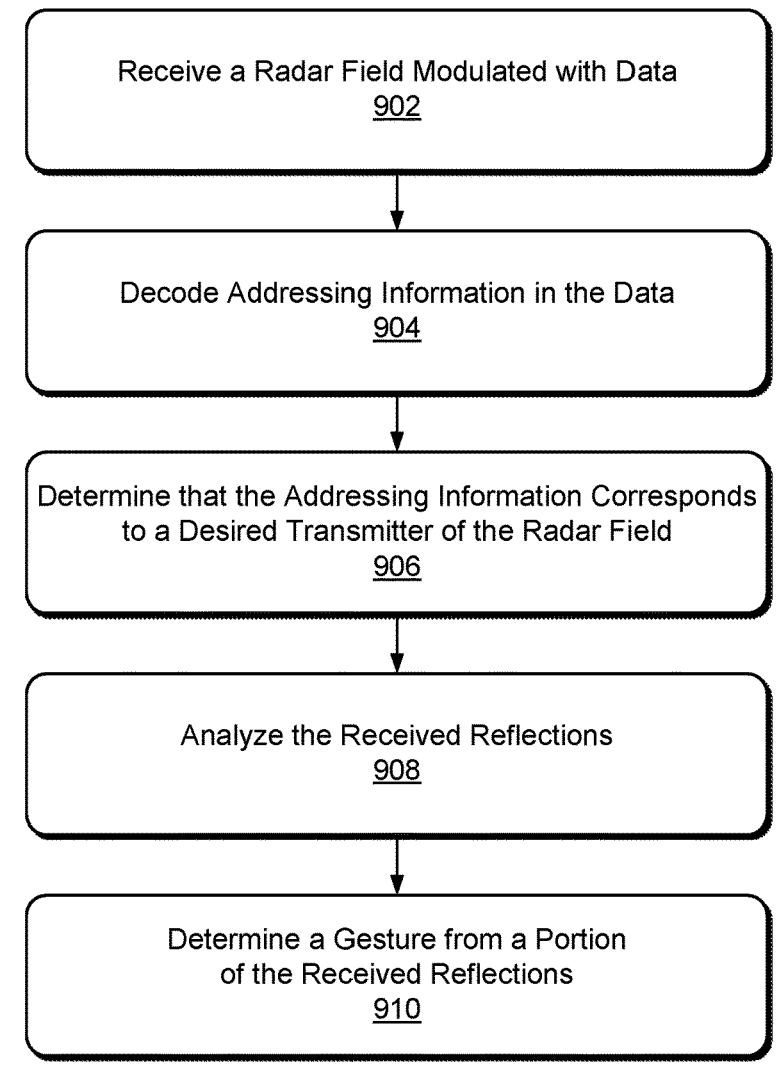
FIG. 9 illustrates another example flow diagram in accordance with one or more implementations.

FIG. 9 illustrates example method(s) 900 of radar gesture sensing using existing data protocols as generally related to sensing gestures from radar reflections. The order in which the method blocks are described are not intended to be construed as a limitation, and any number of the described method blocks can be combined in any order to implement a method, or an alternate method.

At 902, a radar field that is modulated with data is received. For example, the antennas 214 receive reflections of the modulated radar field for an interaction in the radar field. The antennas 214 provide RF signals from the received reflections to the receive side functionality 704 of the pipeline 700 or the digital signal processing component 216.

At 904, addressing information in the received data is decoded. For example, the receive side functionality 704 of the pipeline 700 or the digital signal processing component 216 captures and processes the RF signals. For instance, digital signal processing component 216 performs sampling on RF signals received by antennas 214 to generate digital samples that represent the RF signals, and processes the digital samples to decode fields of the data packet 302 that were modulated onto the radar field.

At 906, addressing information is determined to correspond to a desired transmitter of the radar field. For example, the digital signal processing component 216 or the receive side functionality 704 of the pipeline 700 compares decoded addressing information in the decoded data packet 302 and compare the addressing information, such as a source address of the source device 402 to a desired source address. If the decoded source address matches the desired source address, the digital signal processing component 216 or the receive side functionality 704 of the pipeline 700 selectively provides digital samples for one or more of the identified fields for successive processing to determine a gesture. Otherwise the digital samples may be discarded.

At 908, the received reflections are analyzed. For example, the receive side functionality 704 of the pipeline 700 or the digital signal processing component 216 processes the provided digital samples to extract information about the target that caused the reflections for successive processing to determine a gesture.

At 910, the gesture is determined using a portion of the received reflections. For example, the receive side functionality 704 of the pipeline 700 or the machine-learning component 218 uses that information in the processed signals to classify or recognize various aspects of the target object. The output logic component 220 may further filter output information generated by digital signal processing component 216 and machine-learning component 218 to further refine the gesture determination.

Example Computing Device

Figure 10:
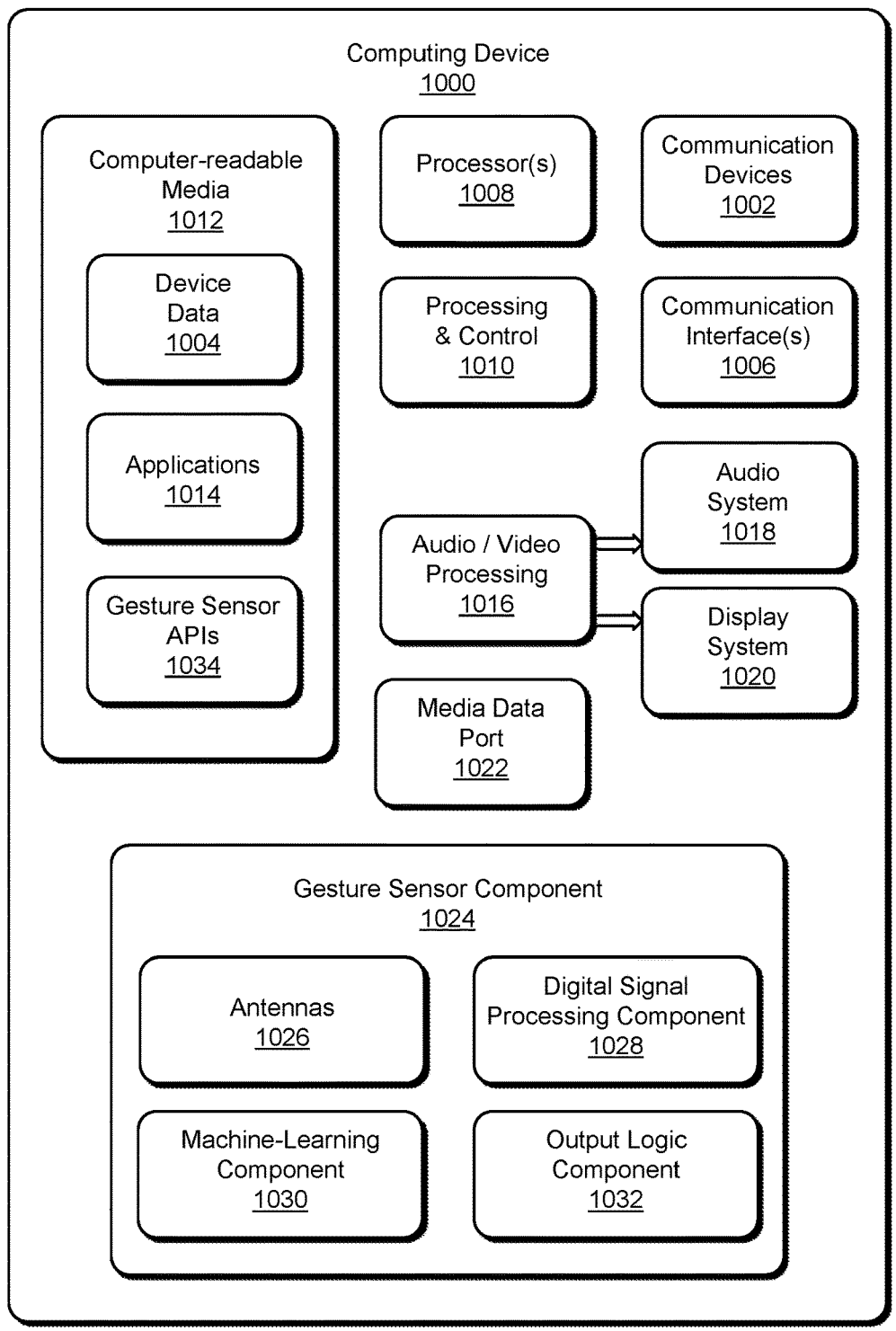
FIG. 10 illustrates an example device in which gesture detection can be employed in accordance with one or more implementations.

FIG. 10 illustrates various components of an example computing device 1000 that incorporates radar gesture sensing using existing data protocols as described with reference to FIGS. 1-9. Computing device 1000 may be implemented as any type of a fixed or mobile device, in any form of a consumer, computer, portable, user, communication, phone, navigation, gaming, audio, camera, messaging, media playback, and/or other type of electronic device, such as computing device 102 described with reference to FIGS. 1 and 2. In light of this, it is to be appreciated that various alternate embodiments can include additional components that are not described, or exclude components that are described, with respect to computing device 1000.

Computing device 1000 includes communication devices 1002 that enable wired and/or wireless communication of device data 1004 (e.g., received data, data that is being received, data scheduled for broadcast, data packets of the data, etc.). The device data 1004 or other device content can include configuration settings of the device and/or information associated with a user of the device.

Computing device 1000 also includes communication interfaces 1006 that can be implemented as any one or more of a serial and/or parallel interface, a wireless interface, any type of network interface, a modem, and as any other type of communication interface. The communication interfaces 1006 provide a connection and/or communication links between computing device 1000 and a communication network by which other electronic, computing, and communication devices communicate data with computing device 1000.

Computing device 1000 includes one or more processors 1008 (e.g., any of microprocessors, controllers, and the like) which process various computer-executable instructions to control the operation of computing device 1000 and to implement embodiments of the techniques described herein. Alternatively or in addition, computing device 1000 can be implemented with any one or combination of hardware, firmware, or fixed logic circuitry that is implemented in connection with processing and control circuits which are generally identified at 1010. Although not shown, computing device 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing device 1000 also includes computer-readable media 1012, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like.

An implementation of the described modules and techniques may be stored on or transmitted across some form of computer-readable media. The computer-readable media may include a variety of media that may be accessed by the computing device 1000. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1000, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Computer-readable media 1012, when configured as computer-readable storage media, provides data storage mechanisms to store the device data 1004, as well as various applications 1014 and any other types of information and/or data related to operational aspects of computing device 1000. The applications 1014 can include a device manager (e.g., a control application, software application, signal processing and control module, code that is native to a particular device, a hardware abstraction layer for a particular device, etc.).

Computing device 1000 also includes audio and/or video processing system 1016 that processes audio data and/or passes through the audio and video data to audio system 1018 and/or to display system 1020 (e.g., a screen of a smart phone or camera). Audio system 1018 and/or display system 1020 may include any devices that process, display, and/or otherwise render audio, video, display, and/or image data. Display data and audio signals can be communicated to an audio component and/or to a display component via an RF link, S-video link, HDMI, composite video link, component video link, DVI, analog audio connection, or other similar communication link, such as media data port 1022. In some implementations, audio system 1018 and/or display system 1020 are external components to computing device 1000. Alternatively or additionally, display system 1020 can be an integrated component of the example electronic device, such as part of an integrated touch interface.

Computing device 1000 also includes a gesture component 1024 (e.g., the gesture sensing component 104) that wirelessly identifies one or more features of a target object, such as a micro-gesture performed by a hand as further described above. Gesture component 1024 can be implemented as any suitable combination of hardware, software, firmware, and so forth. In some embodiments, gesture component 1024 is implemented as an SoC. Among other things, gesture component 1024 includes antennas 1026, digital signal processing component 1028, machine-learning component 1030, and output logic component 1032.

Antennas 1026 transmit and receive RF signals under the control of gesture sensor component. Each respective antenna of antennas 1026 can correspond to a respective transceiver path internal to gesture sensor component 1024 that physical routes and manages outgoing signals for transmission and the incoming signals for capture and analysis as further described above.

Digital signal processing component 1028 digitally processes RF signals received via antennas 1026 to extract information about the target object. This can be high-level information that simply identifies a target object, or lower level information that identifies a particular micro-gesture performed by a hand In some embodiments, digital signal processing component 1028 additionally configures outgoing RF signals for transmission on antennas 1026. Some of the information extracted by digital signal processing component 1028 is used by machine-learning component 1030. Digital signal processing component 1028 at times includes multiple digital signal processing algorithms that can be selected or deselected for an analysis, examples of which are provided above. Thus, digital signal processing component 1028 can generate key information from RF signals that can be used to determine what gesture might be occurring at any given moment.

Machine-learning component 1030 receives input data, such as a transformed raw signal or high-level information about a target object, and analyzes the input date to identify or classify various features contained within the data. As in the case above, machine-learning component 1030 can include multiple machine-learning algorithms that can be selected or deselected for an analysis. Among other things, machine-learning component 1030 can use the key information generated by digital signal processing component 1028 to detect relationships and/or correlations between the generated key information and previously learned gestures to probabilistically decide which gesture is being performed.

Output logic component 1032 logically filters output information generated by digital signal processing component 1028 and/or machine-learning component 1030. Among other things, output logic component 1032 identifies when received information is redundant, and logically filters the redundancy out to an intended recipient.

Computing device 1000 also includes gesture sensor APIs 1034, which are illustrated as being embodied on computer-readable media 1012. Gesture sensor APIs 1034 provide programmatic access to gesture sensor component 1024, examples of which are provided above. The programmatic access can range from high-level program access that obscures underlying details of how a function is implemented, to low-level programmatic access that enables access to hardware. In some cases, gesture sensor APIs 1034 can be used to send input configuration parameters associated with modifying operation of digital signal processing component 1028, machine-learning component 1030, output logic component 1032, or any combination thereof, examples of which are provided above.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A computer-implemented method comprising:
    modulating a radio frequency (RF) signal with data according to a data protocol, the data comprising a training sequence in accordance with the data protocol;
    emitting a radar field using the modulated RF signal, the radar field including the training sequence;
    receiving one or more reflection signals caused by a reflection of the radar field off an object performing a gesture within the radar field, the reflection signals containing portions corresponding to the training sequence; and
    analyzing the portions of the reflection signals corresponding to the training sequence to determine the gesture.

2. The computer-implemented method as described in claim 1, wherein the data protocol defines fields of a data packet used for transmission of the data and wherein the training sequence is included in a preamble field of the data packet.

3. The computer-implemented method as described in claim 2, further comprising:
    transmitting the data to a device using the radar field, the transmitting being effective to enable the device to receive the data using the data protocol.

4. The computer-implemented method as described in claim 3, wherein the emitting the radar field is effective to enable the device to:
    receive one or more other reflection signals caused by the reflection of the radar field off the object performing the gesture within the radar field, the other reflection signals containing portions corresponding to the training sequence; and
    analyze the portions of the other reflection signals corresponding to the training sequence to determine the gesture.

5. The computer-implemented method as described in claim 3, wherein the device uses the training sequence to estimate channel conditions in order to adjust parameters of a receiver in the device.

6. The computer-implemented method as described in claim 1, the method further comprising:
    analyzing portions of the reflection signals not corresponding to the training sequence to determine the gesture.

7. A radar system comprising:
    a first device configured to:
        modulate a radio frequency (RF) signal with data formatted according to a data protocol, the data comprising at least a training sequence in accordance with the data protocol;
        emit a radar field using the modulated RF signal, the radar field including the training sequence;
    a second device configured to:
        receive one or more reflection signals caused by a reflection of the radar field off an object performing a gesture within the radar field, the reflection signals containing portions corresponding to the training sequence; and
        analyze the portions of the reflection signals corresponding to the training sequences to determine the gesture.

8. The radar system as described in claim 7, wherein the data protocol defines fields of a data packet used for transmission of the data and wherein the training sequence is included in a preamble field of the data packet.

9. The radar system as described in claim 8, the first device further configured to transmit the data to the second device using the radar field, and the second device further configured to receive the transmitted data using the data protocol.

10. The radar system as described in claim 7, wherein the second device uses the training sequence to estimate channel conditions between the first device and the second device and wherein the second device uses the estimated channel conditions to adjust parameters of a receiver in the second device.

11. The radar system as described in claim 7, the second device further configured to transmit an indication of the determined gesture to the first device.

12. The radar system as described in claim 7, the first device further configured to:
    receive one or more other reflection signals caused by the reflection of the radar field off the object performing the gesture within the radar field, the other reflection signals containing portions corresponding to the training sequence; and
    analyze the portions of the other reflection signals corresponding to the training sequence to determine the gesture.

13. The radar system as described in claim 12, the first device further configured to:
    analyze other portions of the other reflection signals to determine the gesture.

14. A device comprising a gesture sensing component, the gesture sensing component configured to:
    modulate a radio frequency (RF) signal with data formatted according to a data protocol, the data comprising at least a training sequence in accordance with the data protocol;
    emit a radar field using the modulated RF signal, the radar field including the training sequence;
    receive one or more reflection signals caused by a reflection of the radar field off an object performing a gesture within the radar field, the reflection signals containing portions corresponding to the training sequence; and
    analyze the portions of the reflection signals corresponding to the training sequence to determine the gesture.

15. The device as described in claim 14, wherein the data protocol defines fields of a data packet used for transmission of the data and wherein the training sequence is included in a preamble field of the data packet.

16. The device as described in claim 15, the device further configured to transmit the data to an additional device using the radar field, the transmission being effective to enable the additional device to receive the transmitted data using the data protocol.

17. The device as described in claim 16, wherein the emission of the radar field is effective to enable the additional device to:
    receive one or more other reflection signals caused by the reflection of the radar field off the object performing the gesture within the radar field, the other reflection signals containing portions corresponding to the training sequence; and
    analyze the portions of the reflection signals corresponding to the training sequence to determine the gesture.

18. The device as described in claim 14, the device further configured to:
    analyze other portions of the reflection signals to determine the gesture.

19. The device as described in claim 14, the gesture sensing component comprising one or more antennas, and wherein the device is configured to emit the radar field using the one or more antennas.

20. The device as described in claim 14, the gesture sensing component comprising a digital signal processing component, and wherein the device is configured to modulate the RF signal using the digital signal processing component.

* * * * *